(12) United States Patent
Haberkamp et al.

(10) Patent No.: US 10,414,253 B2
(45) Date of Patent: Sep. 17, 2019

(54) SLIDING / FOLDING SLANTED BACK SOFT TOP ASSEMBLY FOR SUV

(71) Applicant: Bestop, Inc., Louisville, CO (US)

(72) Inventors: William H. Haberkamp, Rochester Hills, MI (US); Eric D. Getzschman, New Baltimore, MI (US); Jose N. Vigil, Westminster, CO (US); Andy Waite, Aurora, CO (US)

(73) Assignee: Bestop, Inc., Louisville, CO (US)

( * ) Notice: Subject to any disclaimer, the term of this patent is extended or adjusted under 35 U.S.C. 154(b) by 83 days.

(21) Appl. No.: 15/595,396

(22) Filed: May 15, 2017

(65) Prior Publication Data

US 2017/0326955 A1 Nov. 16, 2017

Related U.S. Application Data

(60) Provisional application No. 62/336,062, filed on May 13, 2016.

(51) Int. Cl.
| | |
|---|---|
| *B60J 7/02* | (2006.01) |
| *B60J 7/06* | (2006.01) |
| *B60J 7/12* | (2006.01) |
| *B60J 7/043* | (2006.01) |

(52) U.S. Cl.
CPC ............ *B60J 7/026* (2013.01); *B60J 7/028* (2013.01); *B60J 7/061* (2013.01); *B60J 7/1226* (2013.01); *B60J 7/1234* (2013.01); *B60J 7/043* (2013.01); *B60J 7/12* (2013.01)

(58) Field of Classification Search
CPC ... B60J 7/026; B60J 7/028; B60J 7/061; B60J 7/1226; B60J 7/1234; B60J 7/043; B60J 7/12

See application file for complete search history.

(56) References Cited

U.S. PATENT DOCUMENTS

| | | | |
|---|---|---|---|
| 3,819,227 | A | 6/1974 | Carli |
| 6,206,450 | B1 | 3/2001 | Ide et al. |
| 6,409,247 | B1 | 6/2002 | Maass |

(Continued)

FOREIGN PATENT DOCUMENTS

| | | |
|---|---|---|
| BE | 350 963 A | 4/1928 |
| DE | 19544619 A1 | 6/1997 |

(Continued)

OTHER PUBLICATIONS

International Search Report for Application No. PCT/US2017/032715, dated Aug. 24, 2017.

(Continued)

*Primary Examiner* — D Glenn Dayoan
*Assistant Examiner* — Melissa A Black
(74) *Attorney, Agent, or Firm* — Warn Partners, P.C

(57) ABSTRACT

A retractable sliding/folding slanted back soft top assembly for 4-door and 2-door SUVs. A fabric cover is supported by a frame that is at least partially articulatable from at least a closed position to an open air position. The frame includes at least one forward fabric support bow member and at least one rearward fabric support bow member. The rear fabric support bow member being positioned when in the closed position in a manner which allows the fabric to clear a sport bar or "roll bar" member of a vehicle in the closed position such that a rear portion of the top is angled from the vertical when viewing the vehicle from the side.

20 Claims, 22 Drawing Sheets

(56) References Cited

U.S. PATENT DOCUMENTS

| | | |
|---|---|---|
| 9,346,342 B1 | 5/2016 | Bowles |
| 9,776,488 B2 | 10/2017 | Bowles |
| 2001/0030443 A1 | 10/2001 | Barker |
| 2004/0108747 A1 | 6/2004 | Obendiek |
| 2004/0130188 A1 | 7/2004 | Stevens et al. |
| 2005/0134096 A1 | 6/2005 | Fallis, III et al. |
| 2012/0098292 A1 | 4/2012 | Huotari et al. |
| 2012/0286540 A1 | 11/2012 | Moran |
| 2014/0103682 A1 | 4/2014 | Lewis et al. |
| 2014/0138983 A1 | 5/2014 | Haberkamp et al. |
| 2014/0300143 A1 | 10/2014 | Haberkamp et al. |
| 2015/0115646 A1 | 4/2015 | Bowles |
| 2015/0123422 A1 | 5/2015 | Bennett et al. |
| 2015/0246605 A1 | 9/2015 | Kleinhoffer et al. |
| 2015/0352937 A1 | 12/2015 | Haberkamp et al. |
| 2016/0236556 A1 | 8/2016 | Smith et al. |

FOREIGN PATENT DOCUMENTS

| | | |
|---|---|---|
| DE | 29715809 U1 | 10/1997 |
| DE | 19927234 C1 | 7/2000 |
| DE | 101 02 643 A1 | 7/2002 |
| DE | 202011105496 U1 | 1/2012 |
| EP | 1634748 A2 | 3/2006 |
| FR | 2745778 A1 | 9/1997 |
| FR | 2937591 A1 | 4/2010 |
| FR | 2943281 A1 | 9/2010 |
| GB | 296586 A | 9/1928 |
| GB | 311 081 A | 5/1929 |
| GB | 312485 A | 5/1929 |
| GB | 336 514 A | 10/1930 |
| GB | 946781 A | 1/1964 |
| WO | 0132455 A2 | 5/2001 |
| WO | 2004/056596 A2 | 7/2004 |

OTHER PUBLICATIONS

Extended European Search Report for Application No. EP 16 18 5007, dated Jan. 3, 2017.

International Search Report for International Application No. PCT/US2015/022716, dated Jun. 12, 2015.

Extended European Search Report for Application No. EP 17 19 4977 dated Mar. 26, 2018.

International Search Report for Application No. PCT/US2011/001816 filed Oct. 27, 2011.

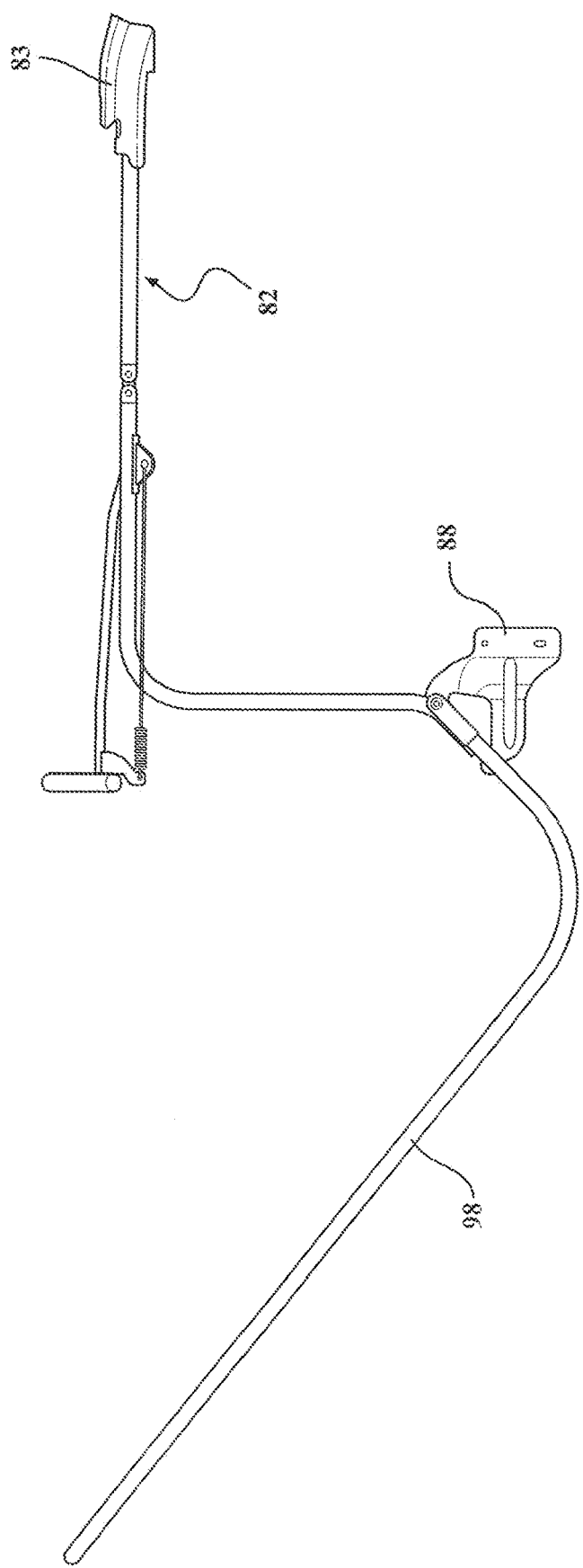

SLIDING / FOLDING SLANTED BACK SOFT TOP ASSEMBLY FOR SUV

CROSS-REFERENCE TO RELATED APPLICATIONS

This application claims the benefit of U.S. Provisional Application No. 62/336,062, filed May 13, 2016. The disclosures of the above application are incorporated herein by reference.

FIELD OF THE INVENTION

The present invention relates to a frameless SUV softop for a vehicle.

BACKGROUND OF THE INVENTION

Providing convertible tops for sport utility (SUV) type vehicles is desired. In recent years, softop technology has advanced. In recent years, the use of "frameless" designs (tops that are not attached to the frame of the SUV) have allowed fold-back sunroof top designs and even completely retractable tops.

Other advances in soft top design has been a sportier and very popular slanted back design. Unfortunately, in the past such slanted designs have required a framed type top, e.g., a lot of conventional framed structure and bows. Therefore, typically customers had a tradeoff decision as to whether they wanted the sporty look on their vehicle or the open air features and amenities offered in a frameless design.

Therefore, there remains a need in the art for a soft top design with the open air features and amenities of a frameless top design but with the styling features of a slanted back design.

SUMMARY OF THE INVENTION

The present invention is directed to a sliding/folding slanted back soft top assembly for 4-door and 2-door SUVs, Jeep® type SUVs, the assembly having a slant back window area feature. A soft top cover is supported by a frame that is articulatable from at least a closed position, open air sunroof position and open stowed position(s). The frame includes at least one forward fabric support bow member and at least one rearward fabric support bow member. The rearward fabric support bow member being positioned when in the closed position in a manner which allows the cover to clear a sport bar or "roll bar" member of a vehicle in the closed position such that a rear portion of the top is angled from the vertical when viewing the vehicle from the side. The positioning of the rearward fabric support bow member also allow the cover to clear the sport bar when rotating to the open stowed position. In general, the soft top is mounted to the sport bars to provide lower profile, shape and support, or is mountable to a tub.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 6B is a side elevation of a front bow system with the addition of a 3-bow, according to another embodiment of the present invention;

DETAILED DESCRIPTION OF THE PREFERRED EMBODIMENTS

The following description of the preferred embodiment(s) is merely exemplary in nature and is in no way intended to limit the invention, its application, or uses.

Referring to the FIGS. 1-14 generally, the present invention provides an articulating/folding slanted back soft top assembly or "soft top cover assembly" or "assembly" (used interchangeably herein). A rear support structure provides for the slanted back. The slanted back provides a profile that is angled downward in the rear of the vehicle toward the tailgate. More particularly, a rear window panel is a predetermined angle from the upright position, off-vertical. Generally, at least 15 degrees from vertical, typically at least 20 degrees, preferably at least 25 degrees, most preferably, at least 35 degrees.

The soft top includes an articulating folding frame that folds into a convertible/stowed/down position. The soft top assembly mounts to a vehicle body structure, e.g., body tub or sport bar, most preferably, to the sport bar. Both independently removable and non-removable windows can be incorporated with the assembly (e.g., rear window, rear quarter windows, rear passenger compartment side windows and/or front side windows). The window can be attached to the top deck of the cover and/or stay pad of the cover or with a rear window extrusion mounted to the bow structure or soft goods, e.g., rear window and/or quarter rear windows that are attached by zippers, retainers, P-welt retainers within channels, J hooks, belt rails, door surrounds or any other suitable attachment and combinations thereof. The soft top assembly is incorporated with an articulating portion, including, a sunroof portion, e.g., flip back header, scissor, and/or sliding. The top deck of the cover is attached to a rear most bow provided for the particular slanted back profile/vehicle, e.g., to a main pivoting bow or 3-bow, a 4-bow, 5-bow, etc.

It is understood that the left side of the assemblies are substantially a mirror-image of the right side of the assemblies. Therefore, for example, the rear support includes a pair of upright bows connected to the cross car bow spanning therebetween.

Figure 1:
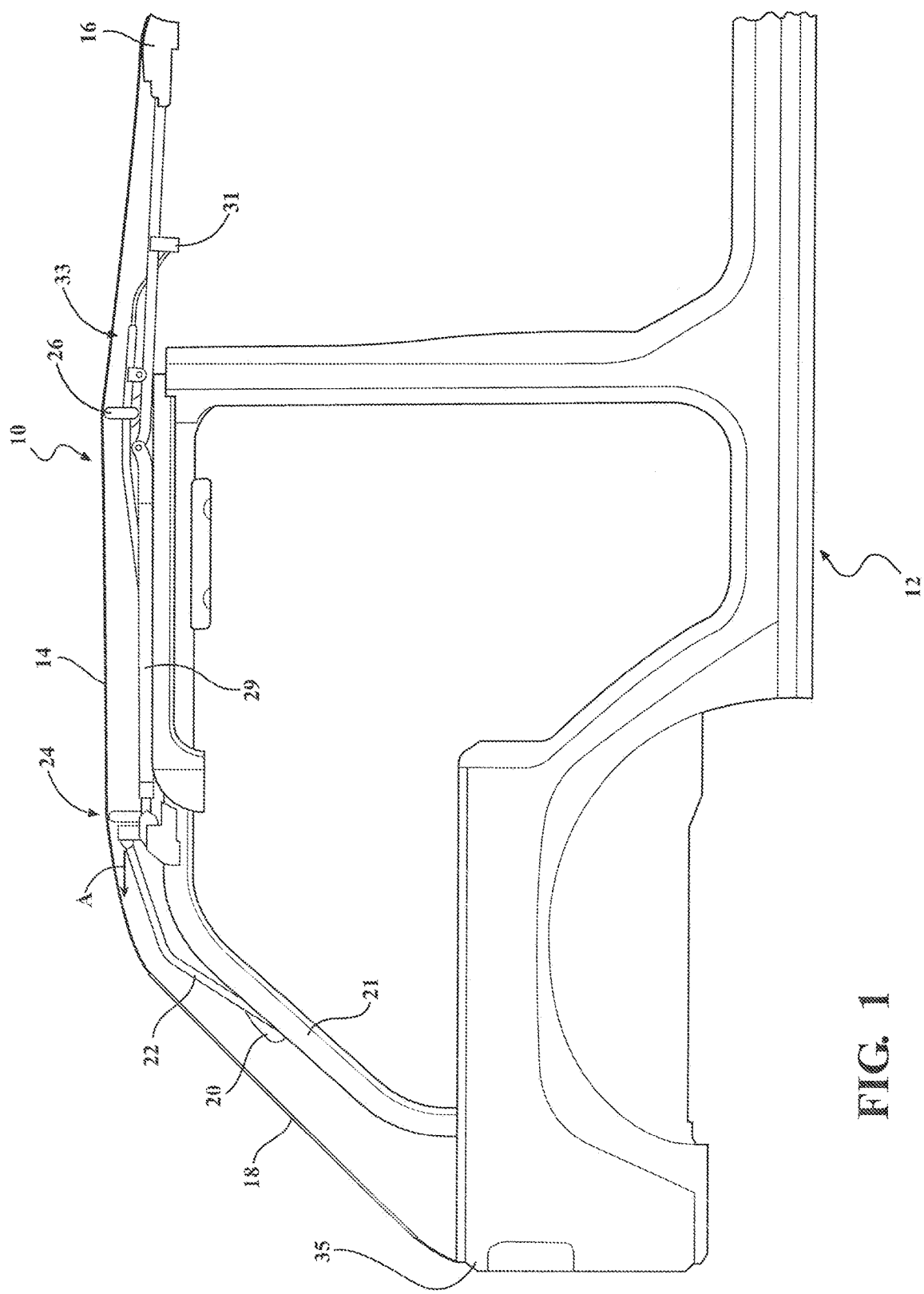
FIG. 1 is a side elevation view of a soft top cover assembly with no 4-bow and having a slanted back window feature and articulating linkage assembly, the assembly is shown in a closed position connected to a 4-door vehicle, in accordance with a first embodiment of the present invention.

FIG. 1 is a side elevation view of a soft top cover assembly shown generally at 10 with no 4-bow, the assembly 10 is shown in a closed position connected to a 4-door SUV vehicle (with portions removed for clarity, e.g., windshield frame, door rails, door surrounds, front sport bars, fasteners to the sport bars, etc) shown generally at 12, in accordance with a first embodiment of the present invention. A cover 14 is connected to a header 16 or "1-bow", which connects cross-car to a windshield frame in the closed position to close out the vehicle interior when desired. The cover 14 is connected to a plurality of bows and moves between at least a closed position, open sunroof position, and open/down position(s) such as folded back behind the rearmost seats for a completely open-air experience. The cover 14 is a soft top material, e.g., twill, sailcloth fabric, etc. A rear window is provided on a panel 18, which is part of the cover 14 or operably connected thereto. The rear window panel 18 is additionally independently removable in one embodiment.

At least one bracket 20 is provided (and optionally incorporated with a lift assist device such as a lockable lift assist) that is connected to one of the bows, preferably an upright bow, most preferably, a 3-bow upright 22. The bracket 20 is connected to the vehicle, preferably the rear sport bar 21, and the 3-bow upright 22 is rotatably connected to the bracket 20 for rotation of the bow 22 between up/down positions. The 3-bow upright 22 is coupled to a bow, preferably, to a 3-bow shown generally at 24, which is a cross vehicle bow and the rearmost cross car bow in this embodiment. The cover 14 top deck is connected to the 3-bow 24. The assembly 10 also includes a 2-bow 26, which is a cross vehicle bow, and a front rail 27 pivotally connected to a rear rail 29 by at least one joint for rotating the header 16 to the open sunroof position. At least one intermediate bow 31 is also provided, such as on a linkage assembly shown generally at 33.

The rear panel 18 angles downward and connects toward the rear or rear corners of the vehicle. In one embodiment, the rear panel 18 is connected to angled upright corners of the rear quarter panels and/or to tailgate bars.

The 3-bow 24 and 3-bow upright 22 helps set the rear height of the top deck/cover transition to the rear window panel.

When the top is closed the material is taut. But when the header 16 is disconnected from the vehicle and rotated rearward to the open sunroof position, the 3-bow can be slid or otherwise moved generally rearward. When the 3-bow 24 is slid back in a rearward direction (as indicated by arrow, "A") to a predetermined location this allows at least one window to be attached by making it easier to reach and manipulate attachment features. According to one embodiment, the articulatable frame is slid in a captive motion track.

Figure 2:
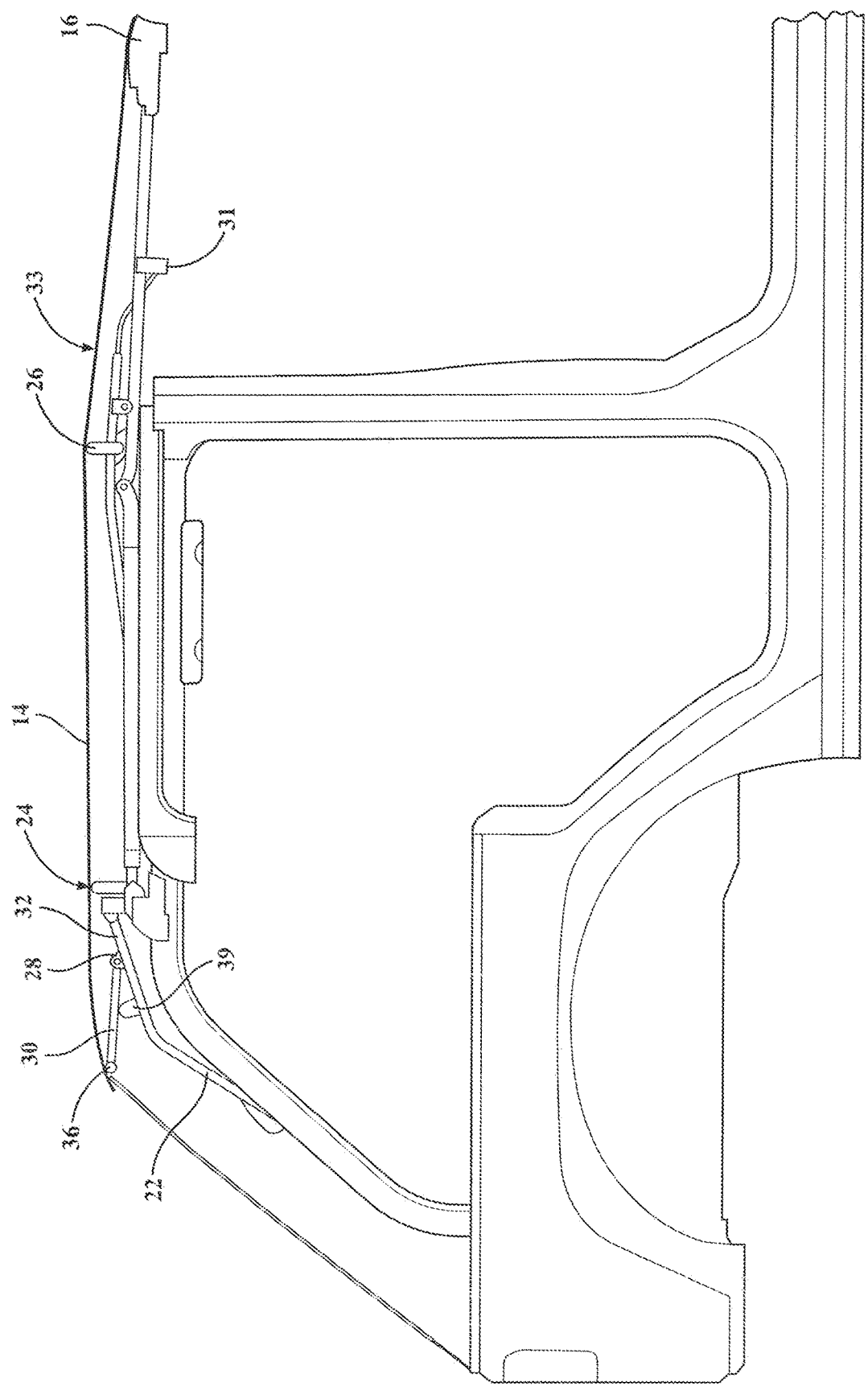
FIG. 2 is a side elevation view of a soft top cover assembly with an articulating 4-bow coupled to a 3-bow upright and having a slanted back window feature and articulating linkage assembly, the assembly is shown in a closed position connected to a 4-door vehicle, in accordance with another embodiment of the present invention.

FIG. 2 is a side elevation view of a soft top cover assembly with an articulating 4-bow 30 rotatably connected to the 3-bow upright 22 at pivot joint 28, the assembly is shown in a closed position connected to a 4-door vehicle (with portions, e.g., front sport bar, removed for clarity), in accordance with another embodiment of the present invention. This embodiment preferably has like components as FIG. 1, however, a bow link 30, preferably, a 4-bow link 30, is provided on a forward portion 32 of the 3-bow upright 22, which 4-bow link 30 is an articulating 4-bow. The 4-bow link 30 is suitably fastened to the 3-bow upright 22, e.g., bolted and/or welded, etc. The 4-bow link 30 has a cross vehicle 4-bow 36 that is connected to the cover 14 top deck. The 4-bow is the rearmost upper bow in this embodiment. The 4-bow 36 sets the rear height of the top deck/cover transition to the rear window panel. A stop 39 is provided on the 3-bow upright 22 to locate the 4-bow link 30/bow 36. Alternatively, stay pad to the rear bow locates.

Figure 3:
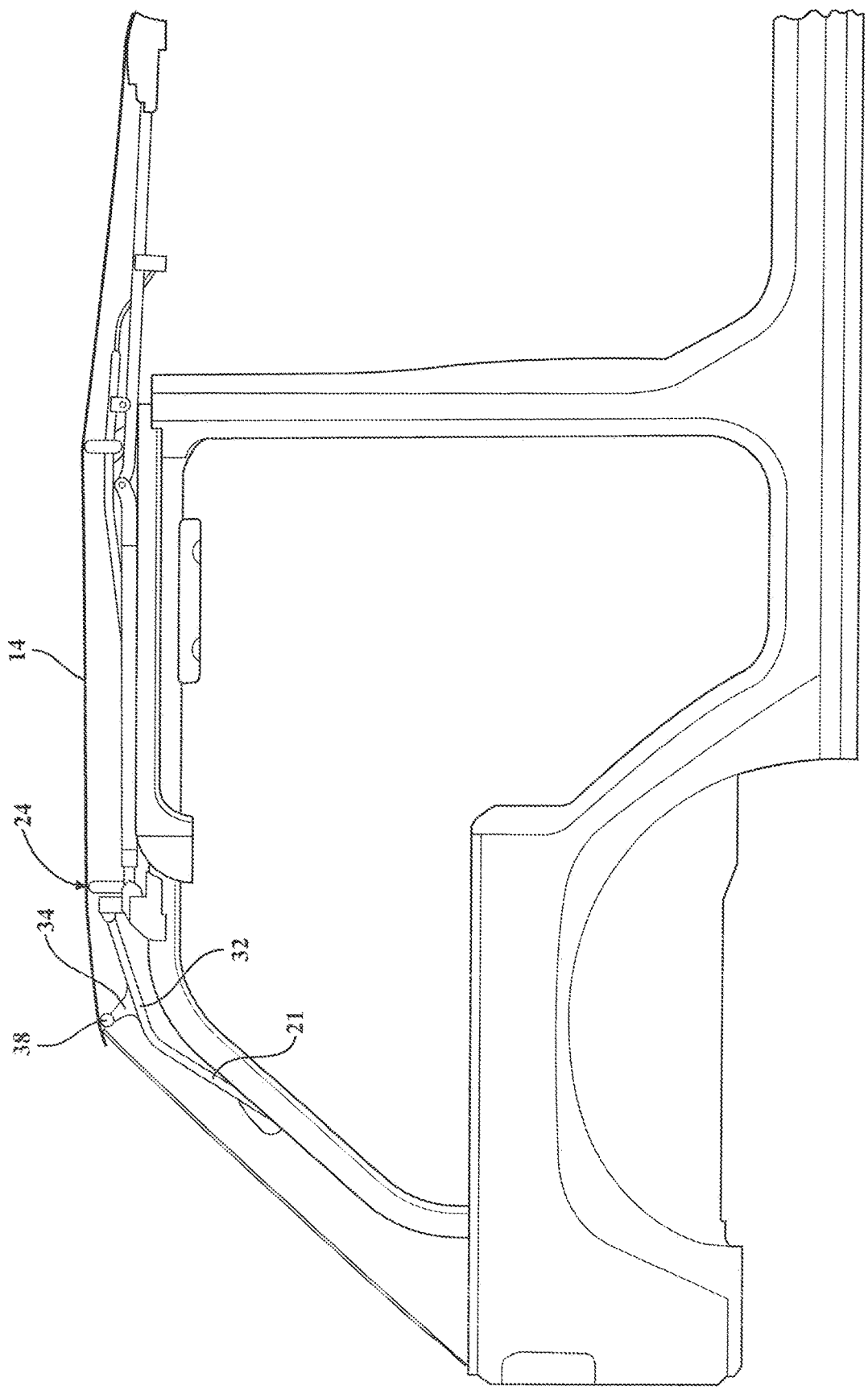
FIG. 3 is a side elevation view of a soft top cover assembly with a fixed 4-bow coupled to a 3-bow upright and having a slanted back window feature, the assembly is shown in a closed position connected to a 4-door vehicle, in accordance with yet another embodiment of the present invention.

FIG. 3 is a side elevation view of a soft top cover assembly with a fixed 4-bow 34 connected to the 3-bow upright 22, the assembly is shown in a closed position connected to a 4-door vehicle (with portions removed for clarity, e.g., windshield frame, front sport bar), in accordance with yet another embodiment of the present invention. This embodiment preferably has like components as FIG. 1, however, a bow 34, preferably, a 4-bow 34, is provided on a forward portion 32 of the 3-bow upright 22, which 4-bow 34 is not an articulating 4-bow. The 4-bow 34 helps set the rear height of the top deck/cover transition to the rear window panel. The 4-bow 34 has a cross vehicle bow 38 that is connected to the cover 14 top deck.

Figure 4:
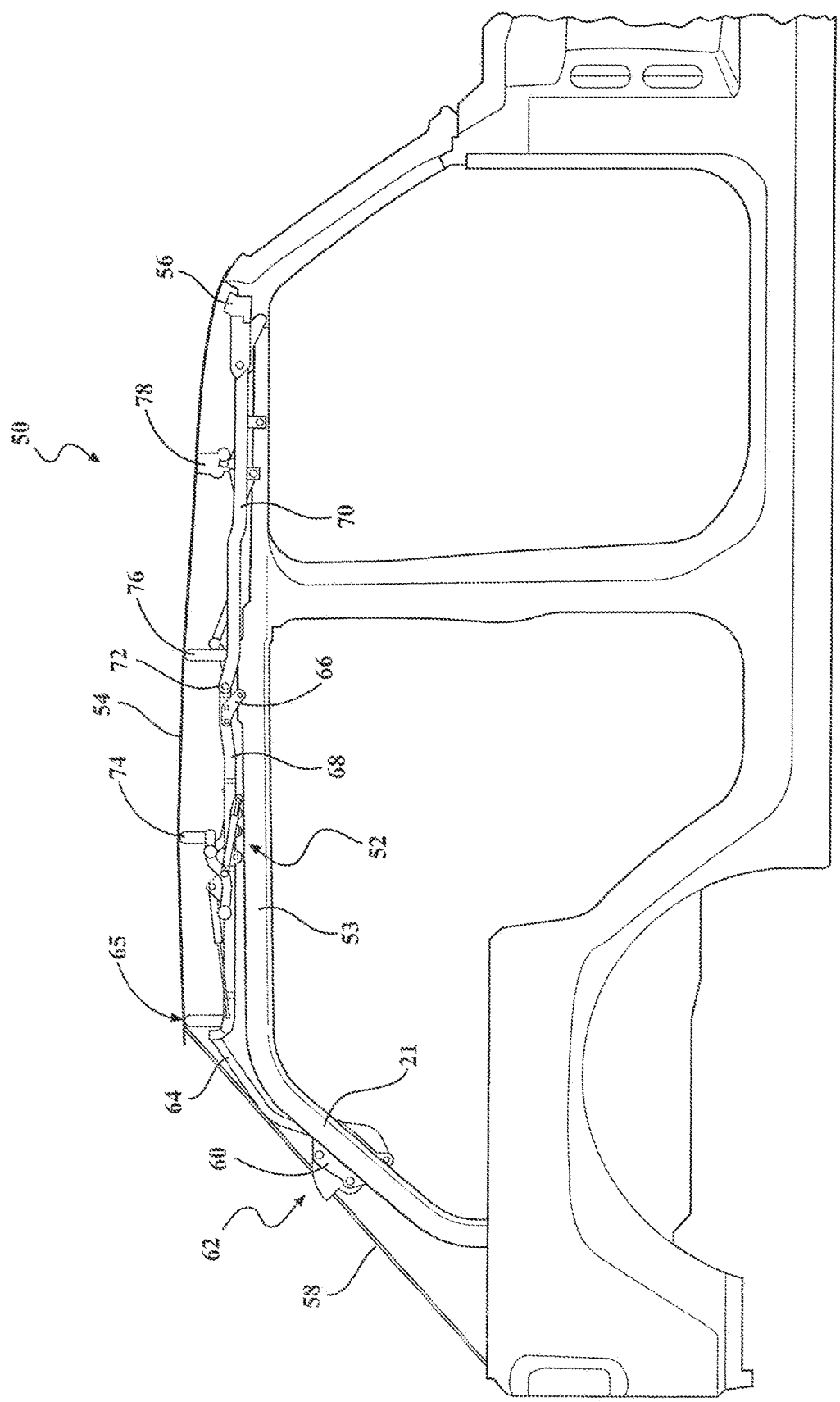
FIG. 4 is a side elevation view of a soft top cover assembly with a rear bow removed and having a slanted back window feature and articulating linkage assembly, the assembly is shown in a closed position connected to a 4-door vehicle, in accordance with another embodiment of the present invention.

FIG. 4 is a side elevation view of a soft top cover assembly shown generally at 50 having a sliding framework indicated generally at 52, the assembly 50 is shown in a closed position connected to a 4-door vehicle, in accordance with another embodiment of the present invention. Preferably, the sliding framework 52 includes rollers guided within guide track(s) that are operably connected to at least the sport bar 53. The guide tracks run fore-aft along the sport bar 53 and may also curve downward to generally follow the rear sport bar 21. Most preferably, at least one bracket 66 is fixedly connected to a linkage 68 of the assembly 50 and is connected to at least one roller that slides in a channel of the track (guide tracks are omitted for clarity). A front rail 70 is pivotally connected to the linkage 68 at at least one pivot joint 72 to rotate the front rail 70 to the open sunroof position.

A cover 54 is operably connected to a header 56 or "1-bow", which connects to a windshield frame in the closed position to close out the vehicle interior. The cover 54 is operably connected to a plurality of bows and moves between at least a closed position, open sunroof position, and open/down position(s) (e.g., such as the articulating linkage assembly 418, depicted in FIGS. 21-22 but without the rear bow). A rear window is provided on a panel 58, which is part of the cover 54 or operably connected thereto. The rear window panel 58 is independently removable in one embodiment (e.g., attached by zippers, retainers, P-welt retainers within channels, belt rail or any other suitable attachment and combinations thereof).

At least one bracket 60 is provided (and optionally incorporated with a lift assist device such as a lockable lift assist shown generally at 62), wherein the bracket 60 is operably connected to one of the bows, preferably an upright bow, most preferably, a 5-bow upright 64. The bracket 60 is connected to the vehicle, preferably the rear sport bar 21, and the 5-bow upright 64 is rotatably connected to the bracket 20 for rotation of the bow 64 between up/down positions. The 5-bow upright 64 is coupled to a bow shown generally at 65, preferably, a 5-bow 65, which is a cross vehicle bow. The assembly 10 also includes a 4-bow 74, 3-bow 76 and 2-bow 78, which are cross vehicle bows. There is no rear 6-bow, e.g., connected to the bracket 62 and extending generally upward in a rearward direction.

The 5-bow 65 and 5-bow upright 64 helps set the rear height of the top deck/cover transition to the rear window panel.

Figure 5:
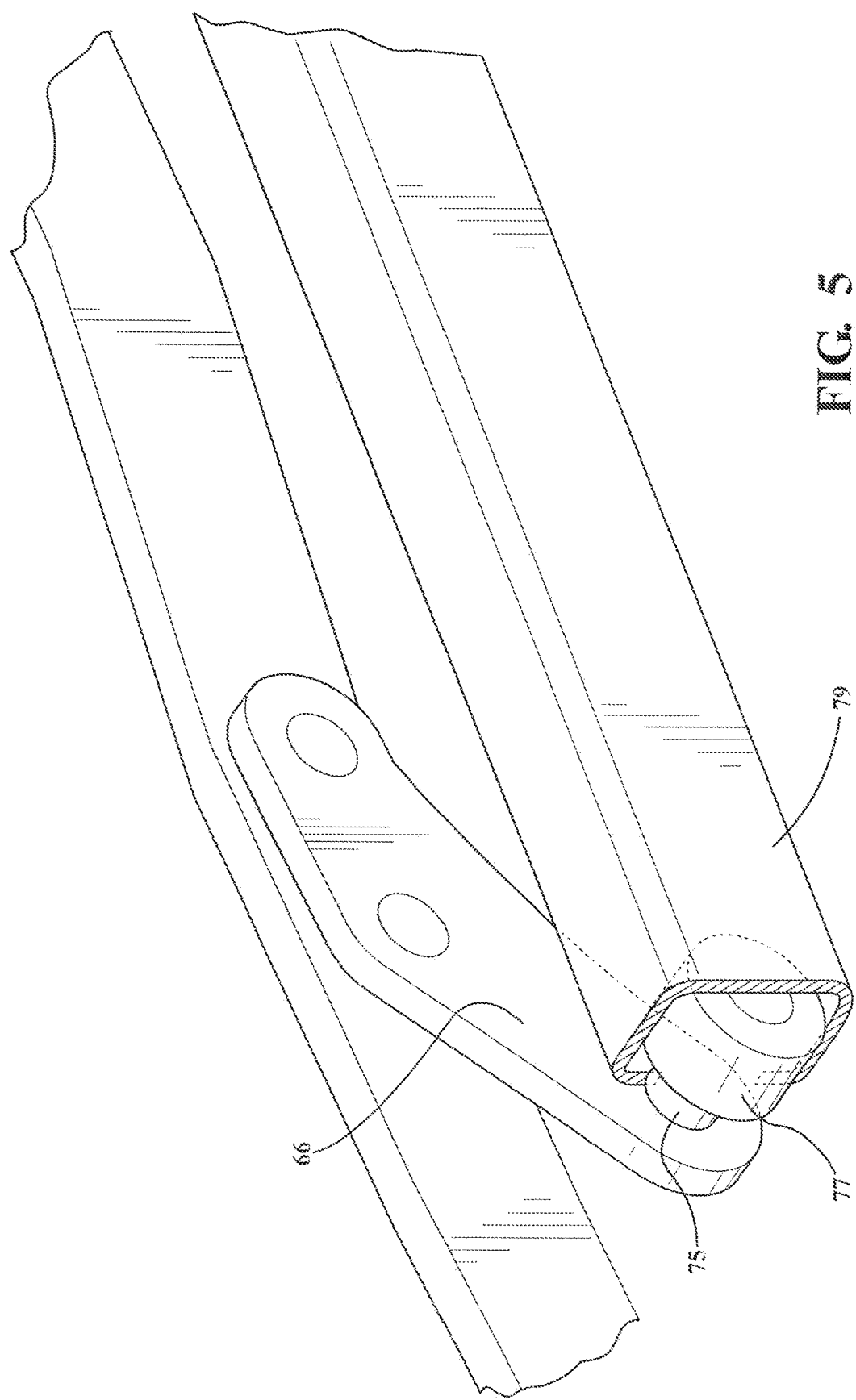
FIG. 5 is a perspective view of a guide roller captured in a track for a soft top cover assembly, according to an embodiment of the present invention.

FIG. 5 depicts an exemplary roller guided in a track. At least one track 79 is connected to the vehicle, e.g., sport bar, and the articulating frame is coupled to the track. Preferably, at least one guide feature retained in the track is slid to move the top rearward to an open/down position. The at least one bracket 66 has a pin 75 connected to at least one roller 79 guided in the guide track 79. The track 79 is connected to the vehicle, preferably, to the sport bar 53 and/or 21 with a plurality of brackets. The roller 77 guided, slid or rolled, in the track 79 moves the top 10 between the open sunroof position and at least one rearward open position.

Figure 6:
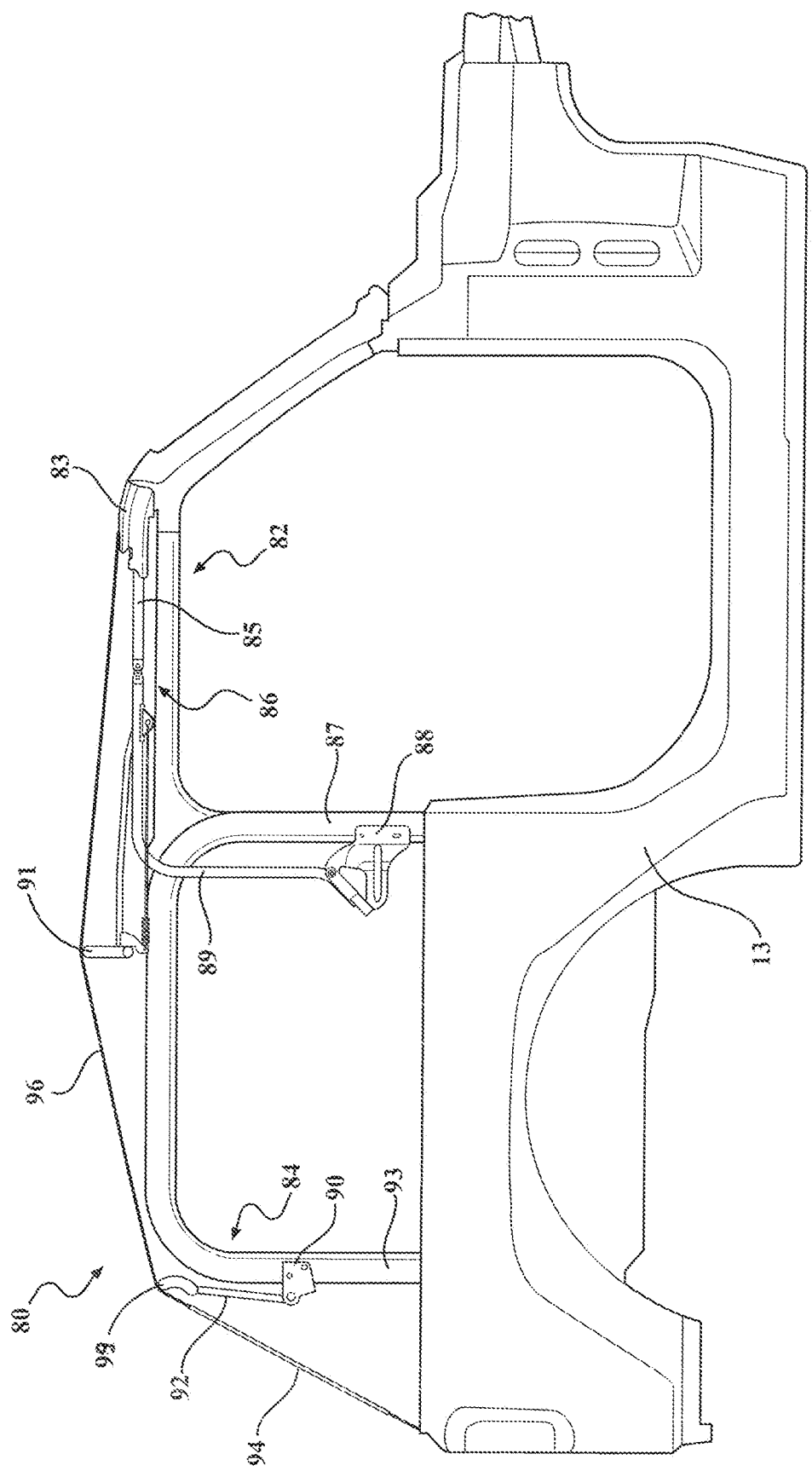
FIG. 6 is a side elevation view of a soft top cover assembly with a dual bow system and having a slanted back window feature, the assembly is shown in a closed position connected to a 2-door vehicle, in accordance with another embodiment of the present invention.

FIG. 6 is a side elevation view of a soft top cover assembly shown generally at 80 having a dual bow system, the assembly 80 is shown in a closed position connected to a 2-door vehicle 13, in accordance with another embodiment of the present invention. There is provided a front bow system shown generally at 82 and a rear support structure that is a rear bow system shown generally at 84. The front bow system 82 is moveable between at least a closed position and open sunroof position. A front rail 85 of the front bow system 82 is connected to a header 83. The front rail 85 is also connected to a rear rail 89 by at least one pivot joint shown generally at 86 such that the front bow system 82 pivots about this joint 86 to the open sunroof position. A bracket 88 is connected to the vehicle, preferably, to a mid-way sport bar upright 87 to pivotally attach the rear rail 89 of the front bow system 82 to the vehicle. The rear rail 89 is also connected to a 2-bow 91. The rear rail 89 rotates the front bow system 82 between the open sunroof position and a downward stowed position.

The rear bow system 84 is a rear bracket system with an upstanding bow to set the rear height of the top deck/cover transition to the rear window. At least one bracket 90 is connected to the vehicle, preferably, to a rear upright sport bar 93. Alternatively, the bracket 90 is mounted to tub(s). A rear bow upright 92 is rotatably connected to the bracket 90. A rear window is provided on a panel 94, which is part of the cover 96 or operably connected thereto. The rear bow upright 92 helps set the rear height of the top deck/cover transition to the rear window panel. The rear bow upright 92 has a cross vehicle bow 99 that is connected to the cover 96 top deck.

The rear window panel 94 is additionally independently removable in one embodiment.

The rear panel 94 angles downward and connects toward the rear or rear corners of the vehicle. In one embodiment, the rear panel 94 is connected to angled upright corners of the rear quarter panels and/or to tailgate bars.

A system to fully open the cover 96 to an open/down position is within the scope of the present invention. In one embodiment, there is no 3-bow. In another, there is a 3-bow connected to the bracket 88, e.g., pivotally connected to the bracket and operably coupled to the cover 96.

Figure 6A:
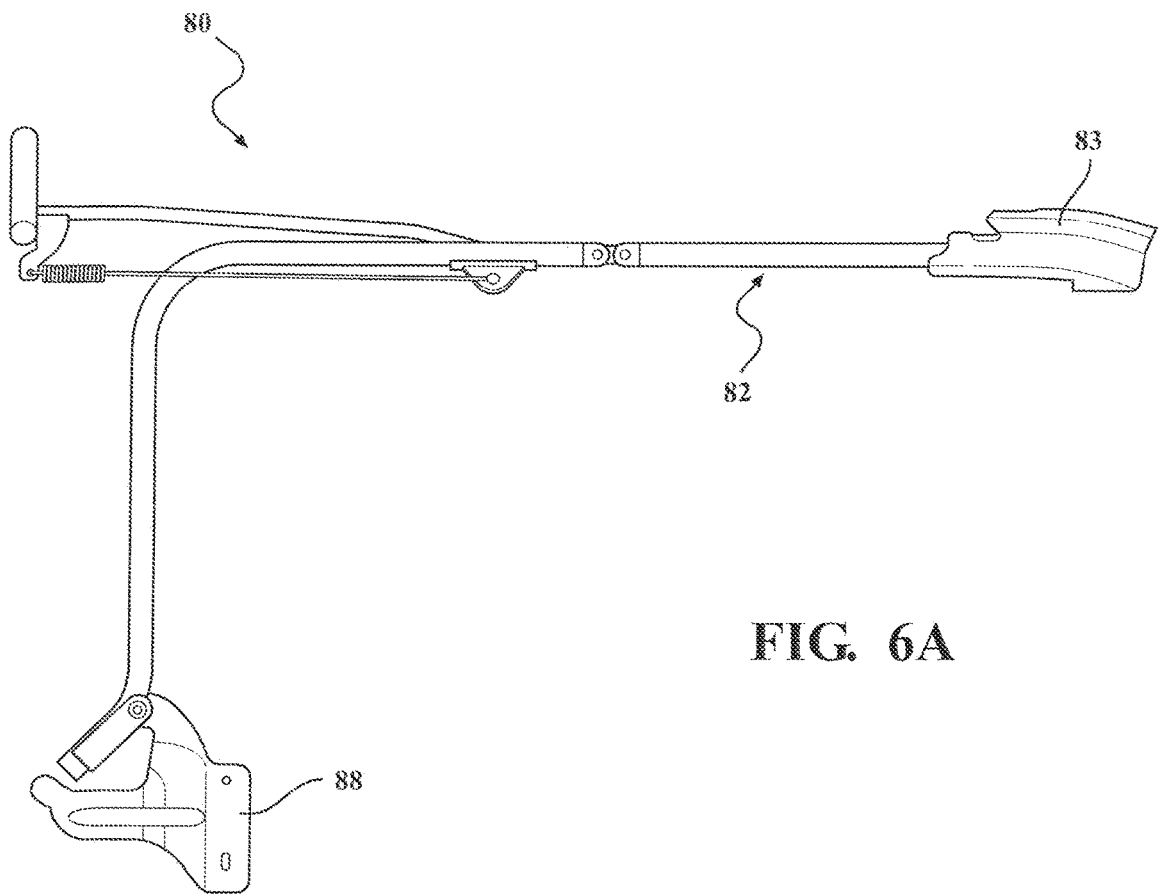
FIG. 6A is a side elevation illustrating a front bow system of the dual bow system having no 3-bow, the assembly being in a closed position, according to an embodiment of the present invention.

FIG. 6A is an enlarged side elevation of FIG. 6 having no 3-bow, according to one embodiment.

FIG. 6B is a side elevation illustrating some features of the soft top cover assembly of FIG. 6 (with the vehicle omitted for clarity), the assembly being in a closed position and having a 3-bow 98, according to another embodiment of the present invention.

Figure 7:
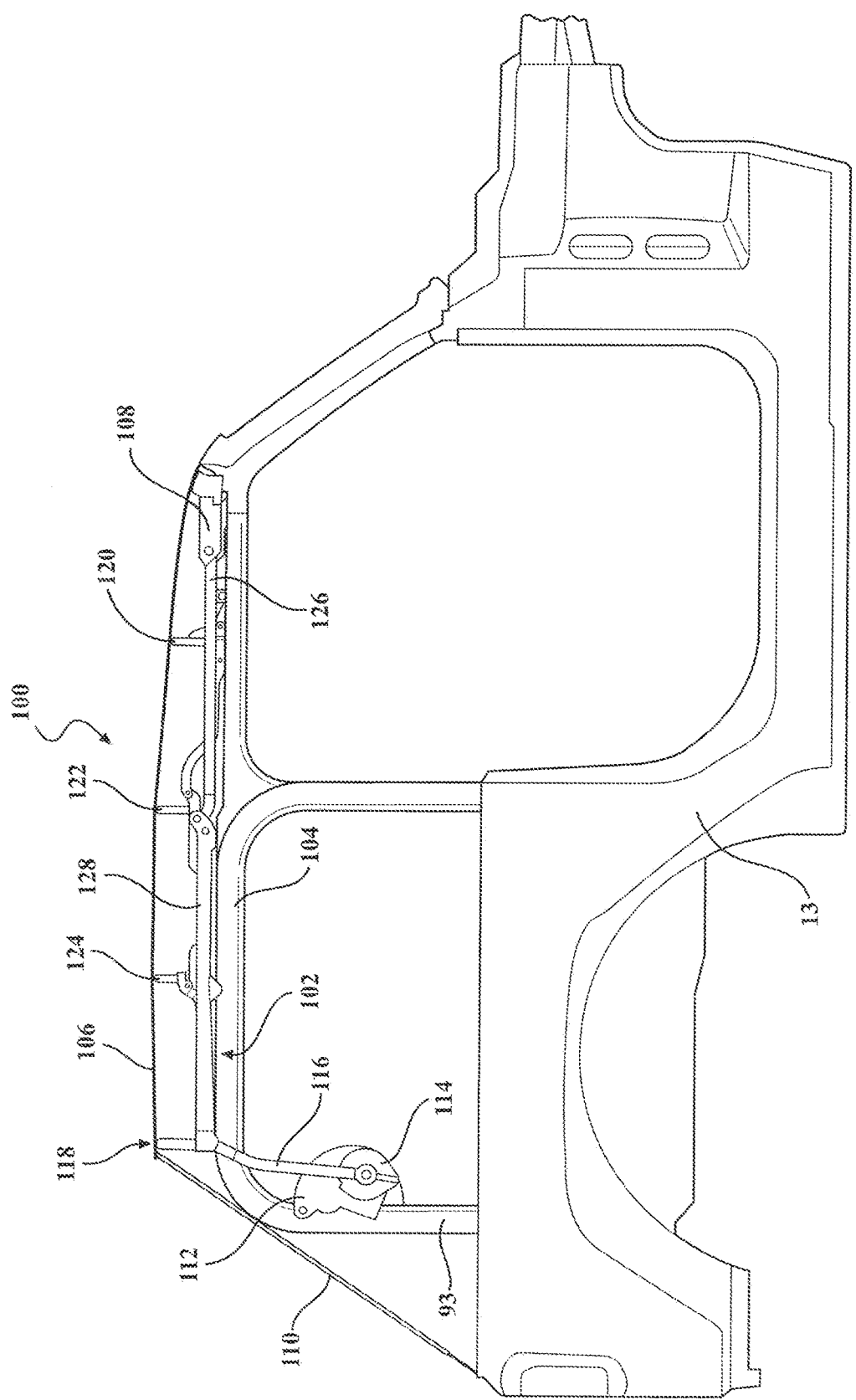
FIG. 7 is a side elevation view of a soft top cover assembly having no rear bow and having a slanted back window feature and articulating linkage assembly, the assembly is shown in a closed position connected to a 2-door vehicle, in accordance with another embodiment of the present invention.

FIG. 7 is a side elevation view of a soft top cover assembly shown generally at 100 with a guide track/slider system indicated generally at 102, the assembly 100 is shown in a closed position connected to a 2-door vehicle 13, in accordance with another embodiment of the present invention. Preferably, the sliding framework, e.g., guide track with rollers guided therein carried by at least one bracket, is operably connected to at least the rear sport bars 104 upper. FIG. 5 depicts an exemplary guide track and roller system. A cover 106 is connected to a header 108 or "1-bow", which connects to a windshield frame in the closed position to close out the vehicle interior. The cover 106 is operably connected to a plurality of bows and moves between at least a closed position, open sunroof position, and open/down position(s) (e.g., such as the articulating linkage assembly 418, depicted in FIGS. 16-18 but without the rear bow of FIG. 16). A rear window is provided on a panel 110, which is part of the cover 106 or operably connected thereto, as set forth above. The rear window panel 110 is independently removable in one embodiment.

At least one bracket 112 is provided (and optionally incorporated with a lift assist device such as a lockable lift assist 114) that is connected to a rear support structure including one of the bows, preferably an upright bow, most preferably, a 5-bow upright 116. The bracket 112 is mounted to the vehicle, preferably the rear sport bar 93, and the 5-bow upright 116 is rotatably connected to the bracket 112 for rotation of the bow 116 between up/down positions. The 5-bow upright 116 is coupled to a bow shown generally at 118, preferably, a 5-bow 118, which is a cross vehicle bow. The assembly 100 can also include a 2-bow 120, 3-bow 122 and 4-bow 124 which are cross vehicle bows. The assembly also includes a front rail 126 pivotally connected to a rear rail 128 by at least one joint for rotating the header 108 to the open sunroof position. There is no rear bow (e.g., such as an original equipment rear bow, extending generally upward in a rearward direction.

The rear panel 110 angles downward and connects toward the rear or rear corners of the vehicle. In one embodiment, the rear panel 110 is connected to angled upright corners of the rear quarter panels and/or to tailgate bars.

The 5-bow 118 and 5-bow upright 116 helps set the rear height of the top deck/cover transition to the rear window panel.

In any of the aforementioned embodiments, more or less bows are contemplated (including fabric management bows, bows to clear the cover for articulating down to the stowed position, etc) depending on the application without departure from the scope of the present invention. The additional bows can, by way of non-limiting example, be mounted off existing holes for a stay pad, mounted off uprights for additional articulations, etc.

Figure 8:
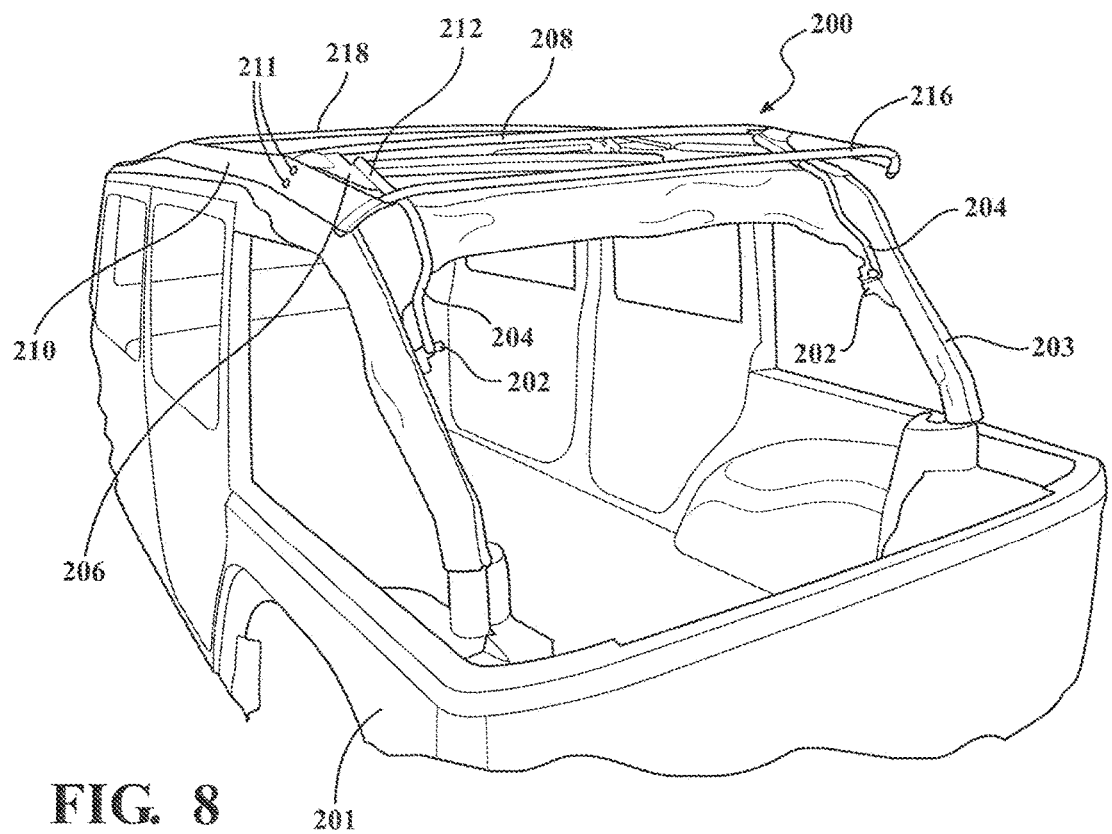
FIG. 8 is a left side rear perspective view of a soft top cover assembly in a closed position, according to the present invention.

Referring generally to FIGS. 8-14, a soft top cover assembly, shown generally at 200, is provided that is a slanted back profile, according to an embodiment of the present invention (with the cover removed for clarity). The assembly 200 in FIG. 8 is in a closed position on a vehicle 201. A cover is operably connected to a header (shown in FIG. 2), which connects to a windshield frame in the closed position to close out the vehicle interior. The cover is operably connected to a plurality of bows and moves between at least a closed position, open sunroof position, and open/down position. A rear window is provided on a panel, which is part of the cover or operably connected thereto. The rear window is independently removable in one embodiment. The rear panel angles downward and connects toward the rear or rear corners of the vehicle. Preferably, the front of the assembly is a flip back sunroof that moves between the closed and open sunroof position (e.g., FIG. 2).

At least one bracket 202 is provided (and optionally incorporated with a lift assist device such as a lockable lift assist) that is mounted to the vehicle, preferably the rear sport bar 203, one of the bows, preferably an upright bow, most preferably, a 3-bow upright 204, is rotatably connected to the bracket 202 to rotate the cover between the up position and the open/down position. The 3-bow upright 204 is connected to a 3-bow 208 via a bracket 206 that is connected to the 3-bow 208 and to the 3-bow upright 204. The 3-bow is a cross car bow. Optionally, the bracket 206 is fastened to a strap pad 210, e.g., woven strap, by a plurality of fasteners 211.

A 4-bow link 212 is mounted to the 3-bow upright 204 via a pivot joint 214 (alternatively, the joint 214 is a fixed joint). The 4-bow link 212 is connected to a 4-bow 216, which is a cross vehicle bow. This 4-bow 216 is the rearmost bow in this embodiment. The 4-bow 216 sets the rear height of the top deck/cover transition to the rear window panel.

The assembly also includes at least a 2-bow 218. Additional bows, such as intermediate bows or fabric management bows, and additional linkages are within the scope of the present invention.

Figure 10:
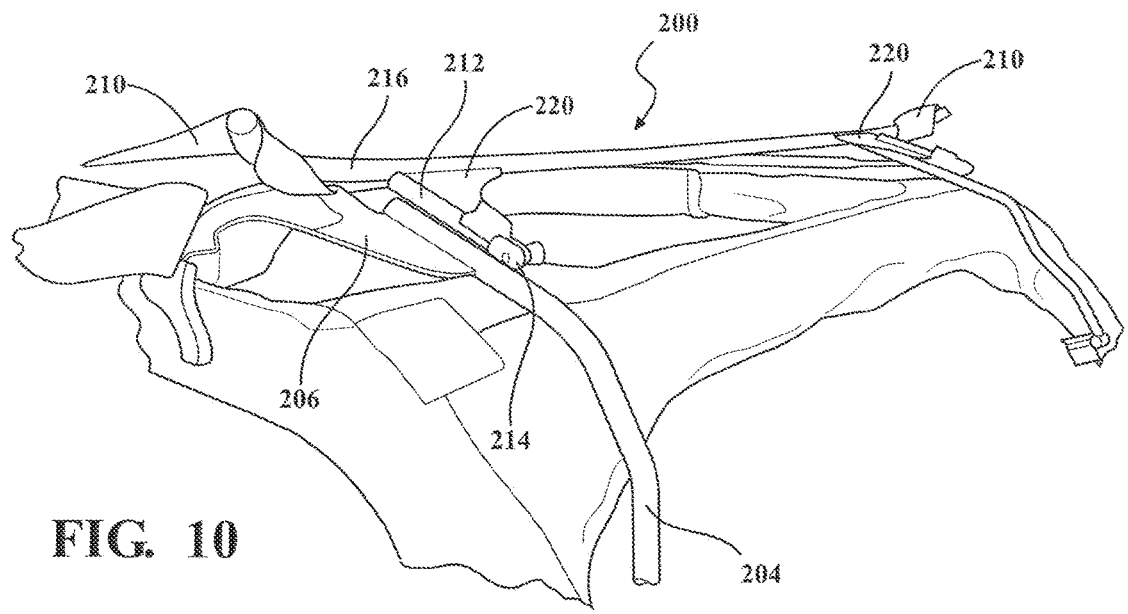
FIG. 10 is a perspective view of FIG. 9 with a bow and upright bow flipped up and forward, according to an embodiment of the present invention.

Another bracket 220 connects the 4-bow 216 to the 4-bow link 212 (as shown in FIG. 10 where the 4-bow 216 is flipped up/forward revealing the bracket 220).

The assembly also includes a lockout system shown generally at 222, including an upstanding brace 224 connected to the 3-bow upright 204 to selectively hold the 4-bow link 212 in a locked position. A mounting bracket 226 is provided on the bow 204 to pivotally connect the 4-bow link 212 at the joint 214. The 4-bow link 212 is also connected to the bracket 220 connected to the 4-bow 216. The forward end of the 3-bow upright 204 is connected to the other bracket 206 which is operably connected to a spring system shown generally at 228. The 4-bow link 212 of the lockdown assembly 224 selectively fits into the brace 224 to hold the 4-bow 216 generally in a locked position.

Referring to FIGS. 15-23 generally, there are provided additional embodiments with a rear bow added. These tops are preferably not slanted back or are minimally slanted. Thus, the rear window will be more vertical to the top deck of the cover. However, the soft tops are convertible to a slant back with modifications, including, removing the rear bow and using a suitable cover for a rear support structure of a slanted back arrangement, depending on the particular application. It is particularly preferable in an embodiment that the articulating frame largely stays the same, regardless of whether or not the soft top assembly is a slanted back, but the rear bow features are removed and any other suitable modifications are made or attachment features added to set the rear height of the top deck/cover transition to the rear window panel depending on the application when a slanted back is desired. This results in significant advantages by not having to change out the entire soft top assembly. Further, universal framework can be used.

Referring more particularly to FIGS. 15-18, there is provided a soft top cover assembly shown generally at 300 in a closed position (or "up position") connected to a 2-door vehicle 13 (the cover and windows are omitted for clarity) with the addition of a rear bow, according to an embodiment of the present invention. This embodiment is similar to FIG. 7, however, there is a rear bow link 318 with a lift assist and handle release provided on the rear bow, shown generally at 316. The assembly 300 has a guide track/slider system indicated generally at 302. Preferably, the sliding framework 302, e.g., guide track with a plurality of rollers guided therein such as depicted in FIG. 5) is operably connected to at least the rear sport bars 304. A cover is operably connected to a header 308, which connects to a windshield frame in the closed position to close out the vehicle interior. The cover is operably connected to a plurality of bows and moves between at least a closed position, open sunroof position (or "sun position"), and open/down position (or "down position"). A rear window is provided on a panel, which is part of the cover or operably connected thereto. The rear window is independently removable in one embodiment. A bracket 310 is provided on the rear sport bars 304 operably connected to one of the bows 312 for rotation to an open/down position. A lift assist assembly shown generally at 314 is operably connected to the bracket 310. Preferably, the lift assist 314 is a locking lift assist. A lift assist release assembly (or "trigger assembly") is provided on the rear bow 316 to release the lift assist 314 to allow rotation of the assembly 300 to the open/down position. The trigger assembly 316 is connected to the rear bow link 318, which link 318 is pivotally connected to the bracket 310, and can be a cord type release with a pull that releases at least one lift assist assemblies 314 at the same time to facilitate rotation of the assembly 300. This embodiment can have two lift assists; the lift assist 314 in the rear cargo area and a lift assist arrangement on a linkage assembly coupled to a side rail 322 of the assembly 300.

Figure 15:
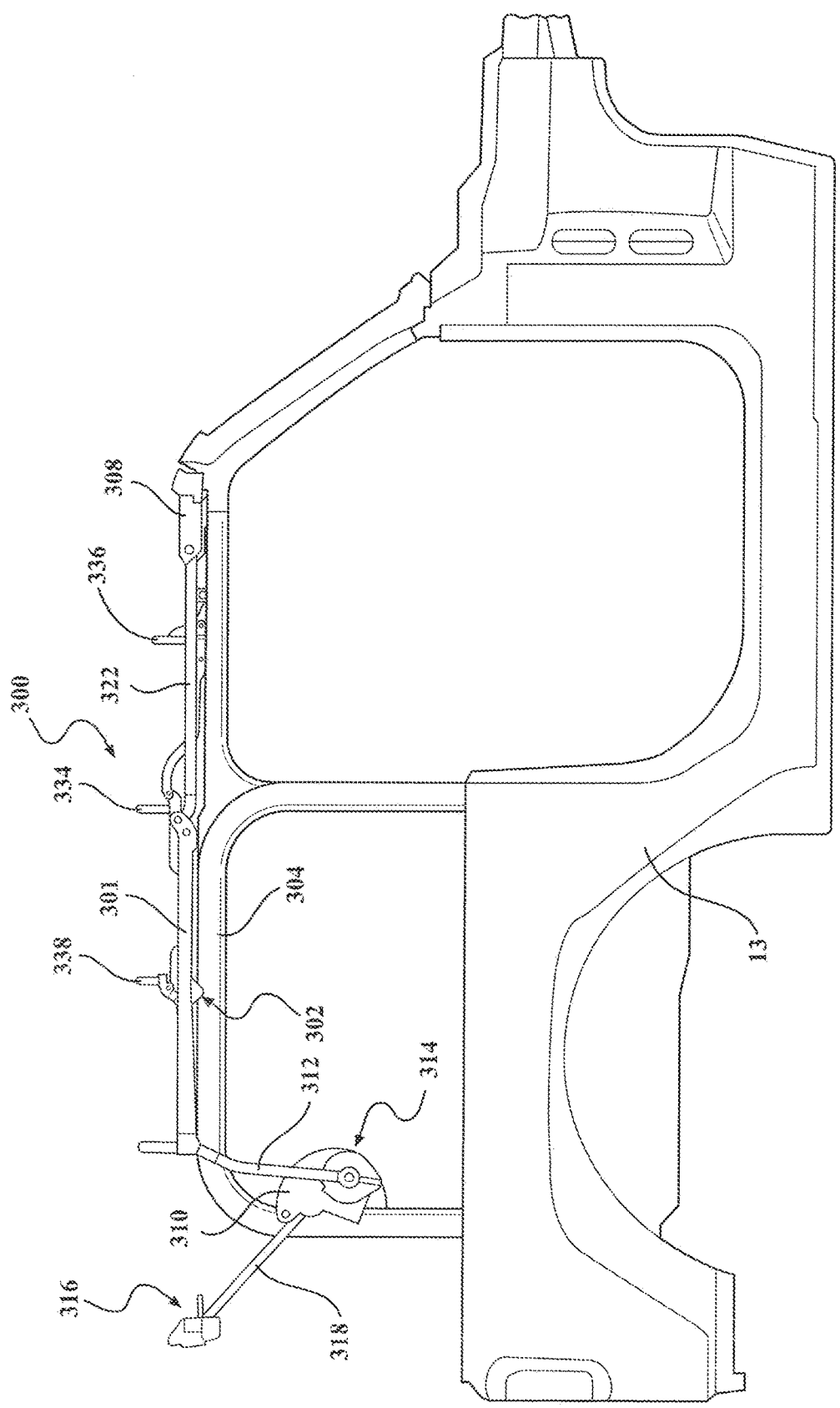
FIG. 15 is a side elevation view of a soft top cover assembly with a rear bow connected, shown in a closed position connected to a 2-door vehicle, according to another embodiment of the present invention.
Figure 16:
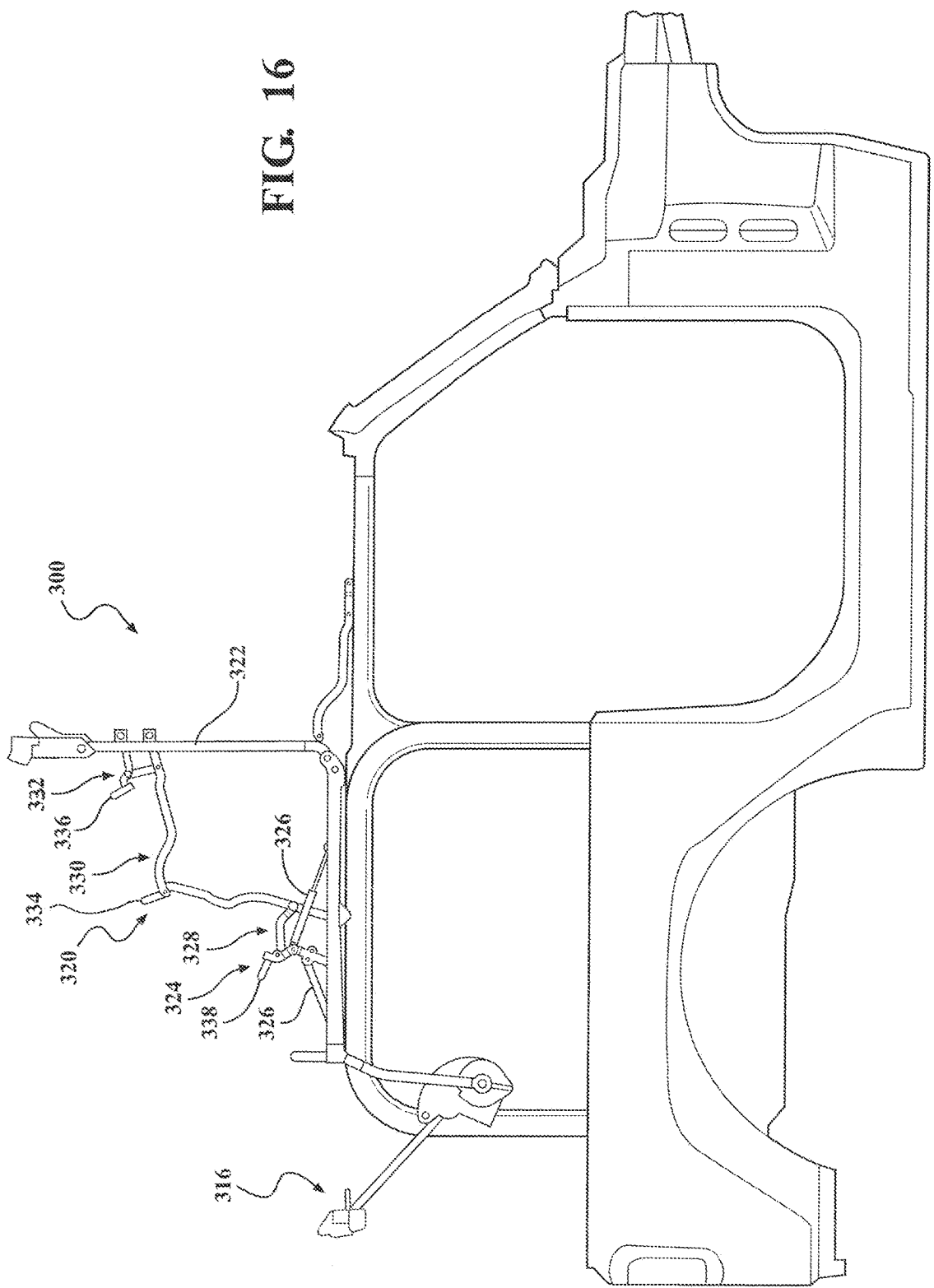
FIG. 16 is a side elevation view of the soft top cover assembly of FIG. 15 with a sunroof portion rotating to an open position.

FIG. 16 is a side elevation view of the soft top cover assembly 300 of FIG. 15 with a sunroof portion in the process of rotating to an open sunroof position, according to the present invention. There is illustrated the articulating linkage assembly shown generally at 320 with at least one lift assist mechanism, shown generally at 324. By way of non-limiting example, the lift assist 324 can include two gas cylinders 326,326 in force opposition coupled to the rear rail 301 and to a linkage assembly shown generally at 328 to assist in opening and closing of the sunroof portion of the soft top. The linkage assembly 328 is connected to a 4-bow 338, which may be a fabric assist bow. A second and third linkage assembly, shown generally at 330 and 322 are provided with a 3-bow and 2-bow, respectively, 324,326 which either or both may be fabric management bows.

Figure 17:
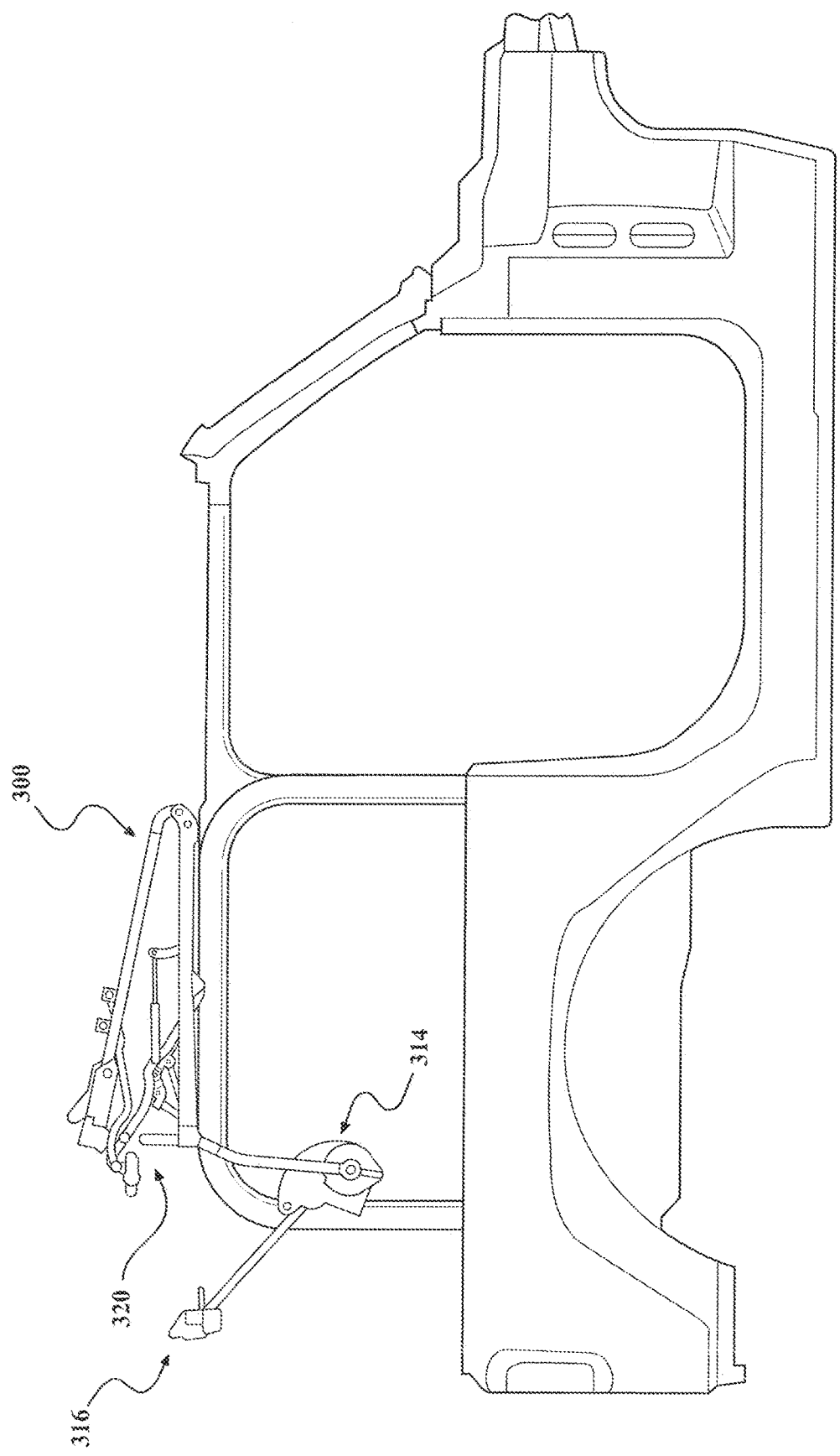
FIG. 17 is a side elevation view of the soft top cover assembly of FIGS. 15-16 in an open sunroof position.

FIG. 17 is a side elevation view of the soft top cover assembly 300 of FIG. 15 in an open sunroof position, according to the present invention.

Figure 18:
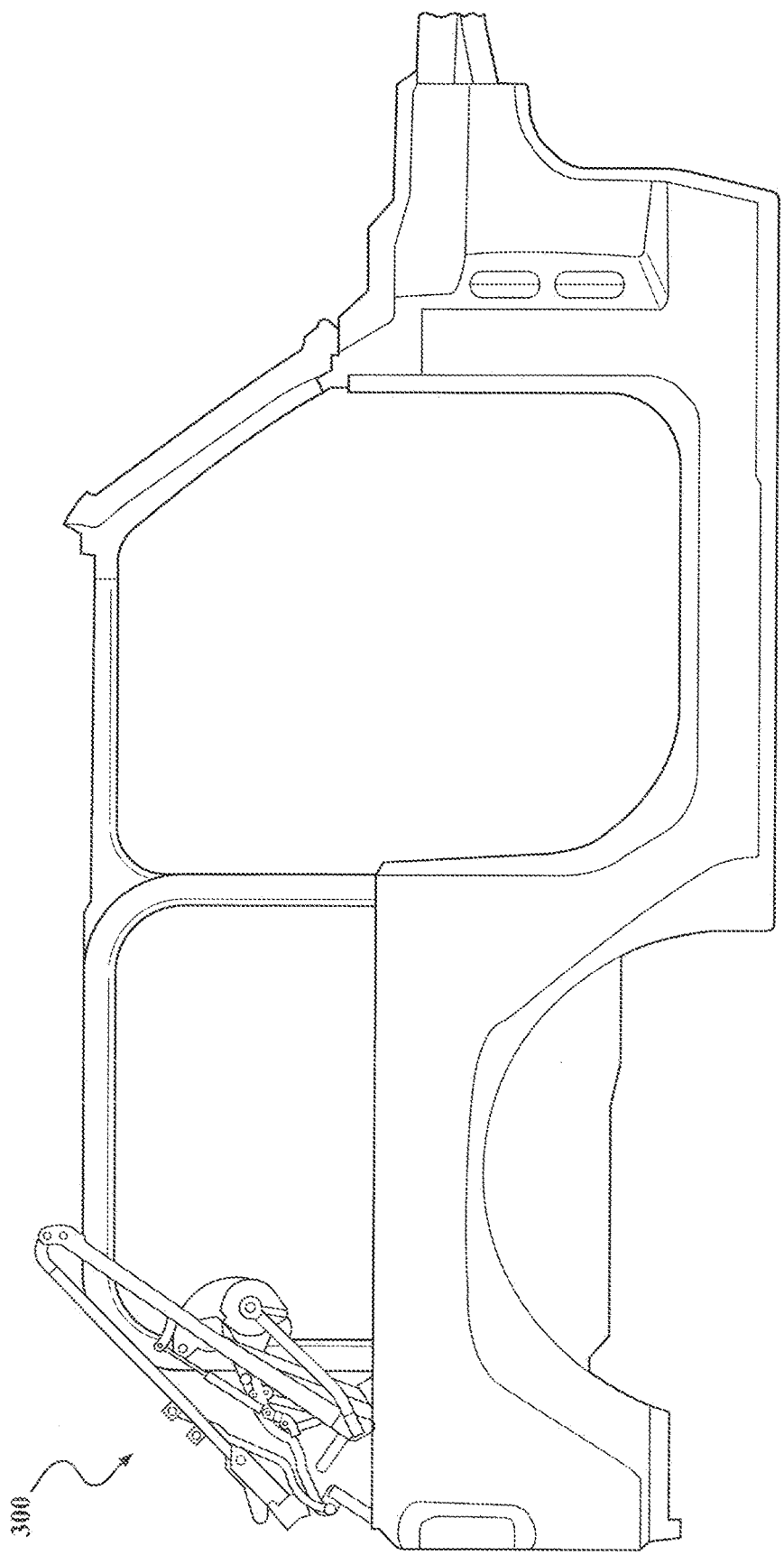
FIG. 18 is a side elevation view of the soft top cover assembly of FIGS. 15-18 in an open/down position.

FIG. 18 is a side elevation view of the soft top cover assembly of FIG. 15 in an open/down position, according to the present invention.

Referring to FIGS. 19-22 generally there is provided a side elevation view of a soft top cover assembly shown generally at 400 in a closed position (or "up position") connected to a 4-door vehicle (the cover and rear window panel is omitted for clarity), according to another embodiment of the present invention. This embodiment is similar to FIG. 4, however, there is a rear bow added, shown generally at 420, with a handle release provided for a lift assist, shown generally at 422. A rear bow link 424 pivotally connects the rear bow 420 to the lift assist 422 and bracket 406. The assembly 400 has a sliding framework indicated generally at 402 (e.g., such as depicted in FIG. 5). Preferably, the sliding framework 402, e.g., guide track with rollers guided therein) is operably connected to at least the rear sport bars. A cover (omitted for clarity) is operably connected to a header 404, which connects to a windshield frame in the closed position to close out the vehicle interior. The cover is operably connected to a plurality of bows and moves between at least a closed position, open sunroof position, and open/down position. A rear window is provided on a panel (omitted for clarity), which is part of the cover or operably connected thereto. The rear window is independently removable in one embodiment. A bracket 406 is operably connected to one of the bows, preferably 5-bow upright 408, for rotation to an open/down position.

The lift assist assembly 422 is operably connected to the bracket 406. Preferably, the lift assist 420 is a locking lift assist. A lift assist release assembly (or "trigger assembly") on the rear bow 420 is provided to release the lift assist 422 to allow rotation of the assembly 400 to the open/down position. The trigger can be a cord type release (or any other suitable release) with a pull that releases at least one lift assist assemblies 422 at the same time to facilitate rotation of the assembly 400. Another lift assist arrangement on a linkage assembly coupled to a side rail 416 of the assembly 400, e.g., incorporating gas cylinders 440,400 in force opposition.

There is illustrated the articulating linkage assembly 418. At least a 4-bow 430 is provided on a first linkage assembly, shown generally at 438. At least a 3-bow 428 is provided on a second linkage assembly, shown generally at 436. At least a 2-bow 426 is provided on a third linkage assembly, shown generally at 434. The 5-bow 432 is also provided connected to the 5-bow upright 408. The 5-bow upright 408 is rotatably connected to the lift assist 422 and bracket 406.

Figure 19:
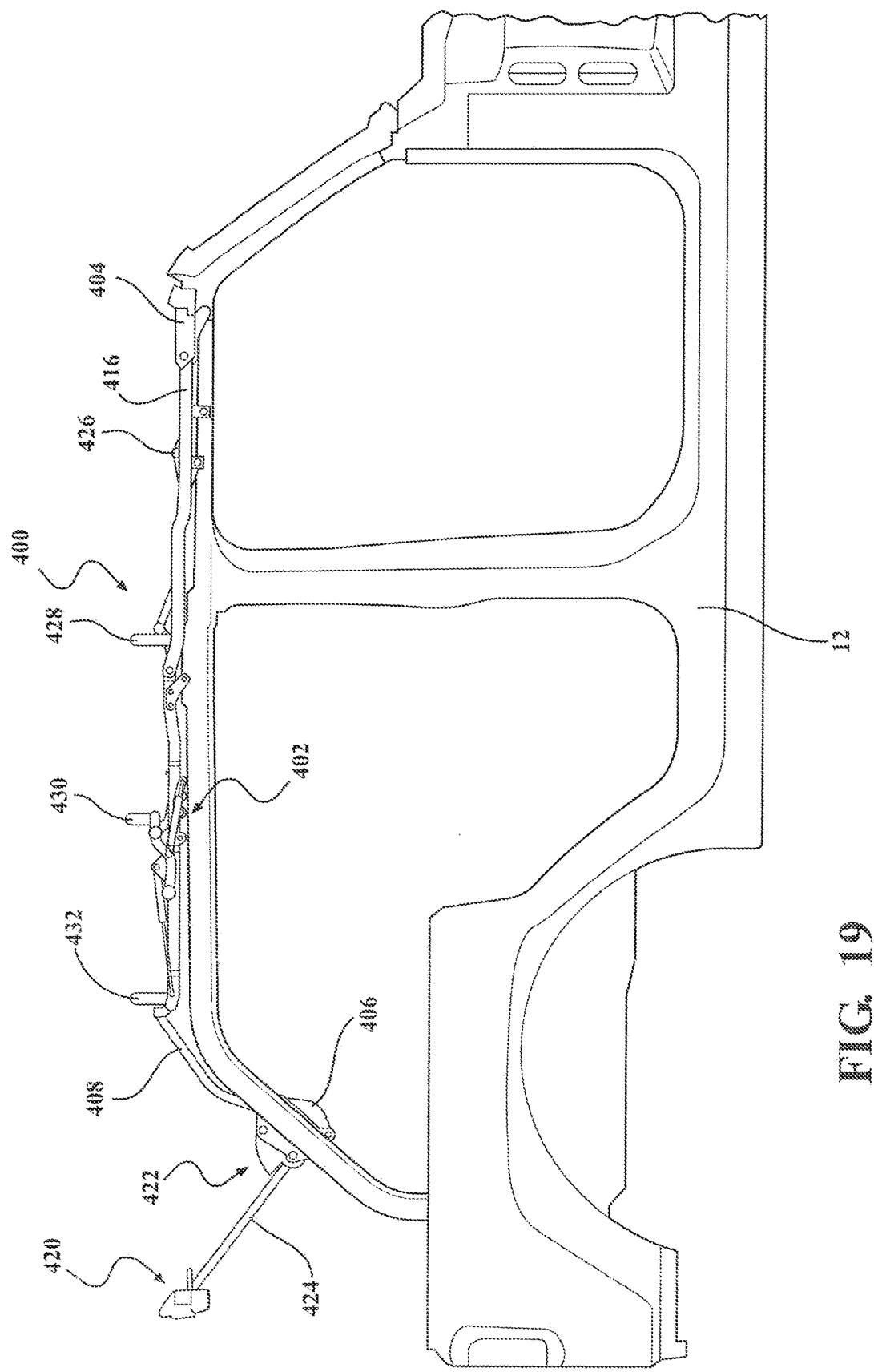
FIG. 19 is a side elevation view of a soft top cover assembly with a rear bow attached, shown in a closed position connected to a 4-door vehicle, according to another embodiment of the present invention.
Figure 20:
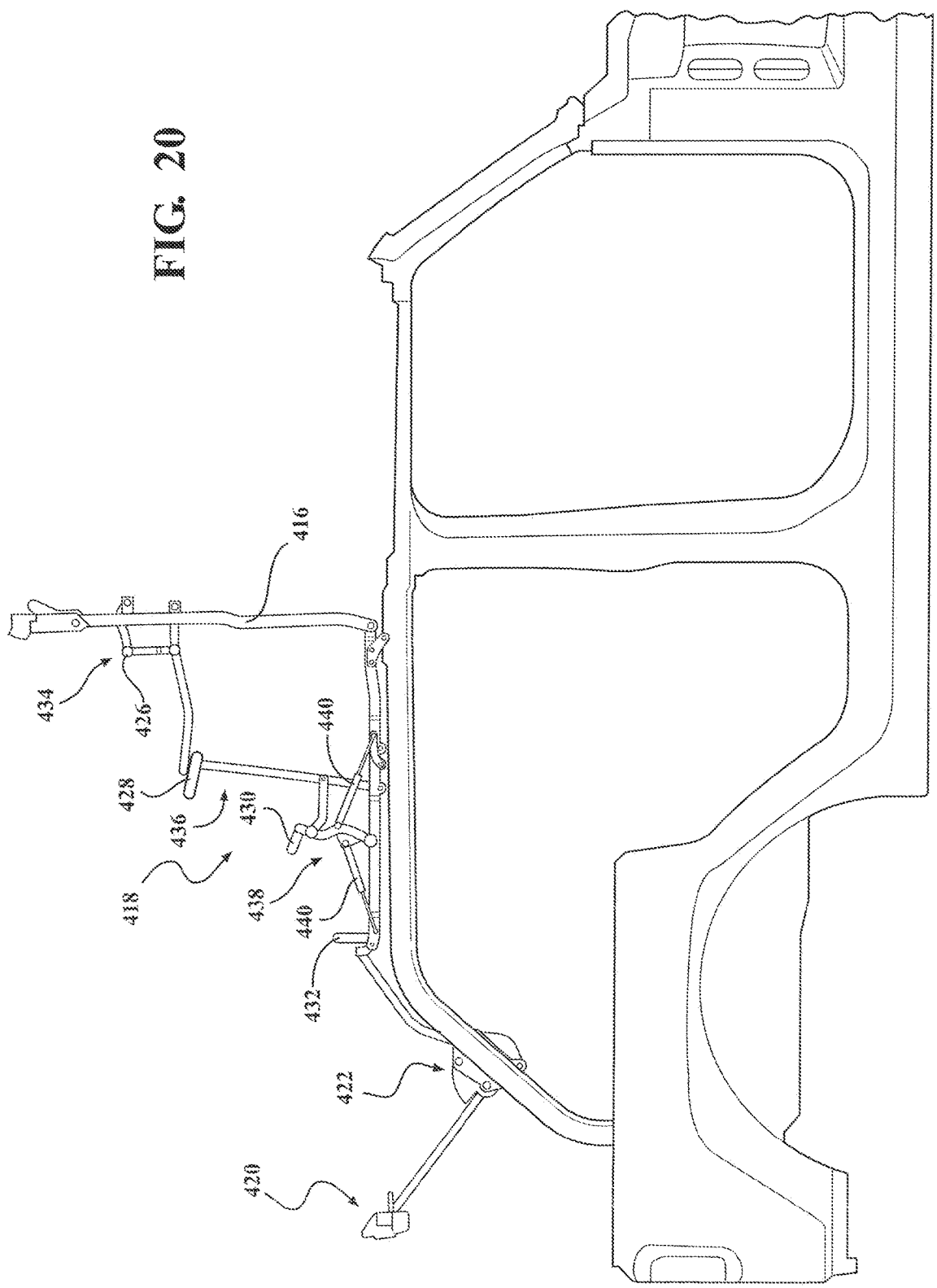
FIG. 20 is a side elevation view of the soft top cover assembly of FIG. 19 with a sunroof portion rotating to an open position.

FIG. 20 is a side elevation view of the soft top cover assembly 400 of FIG. 19 with a sunroof portion in the process of rotating to an open sunroof position, according to the present invention.

Figure 21:
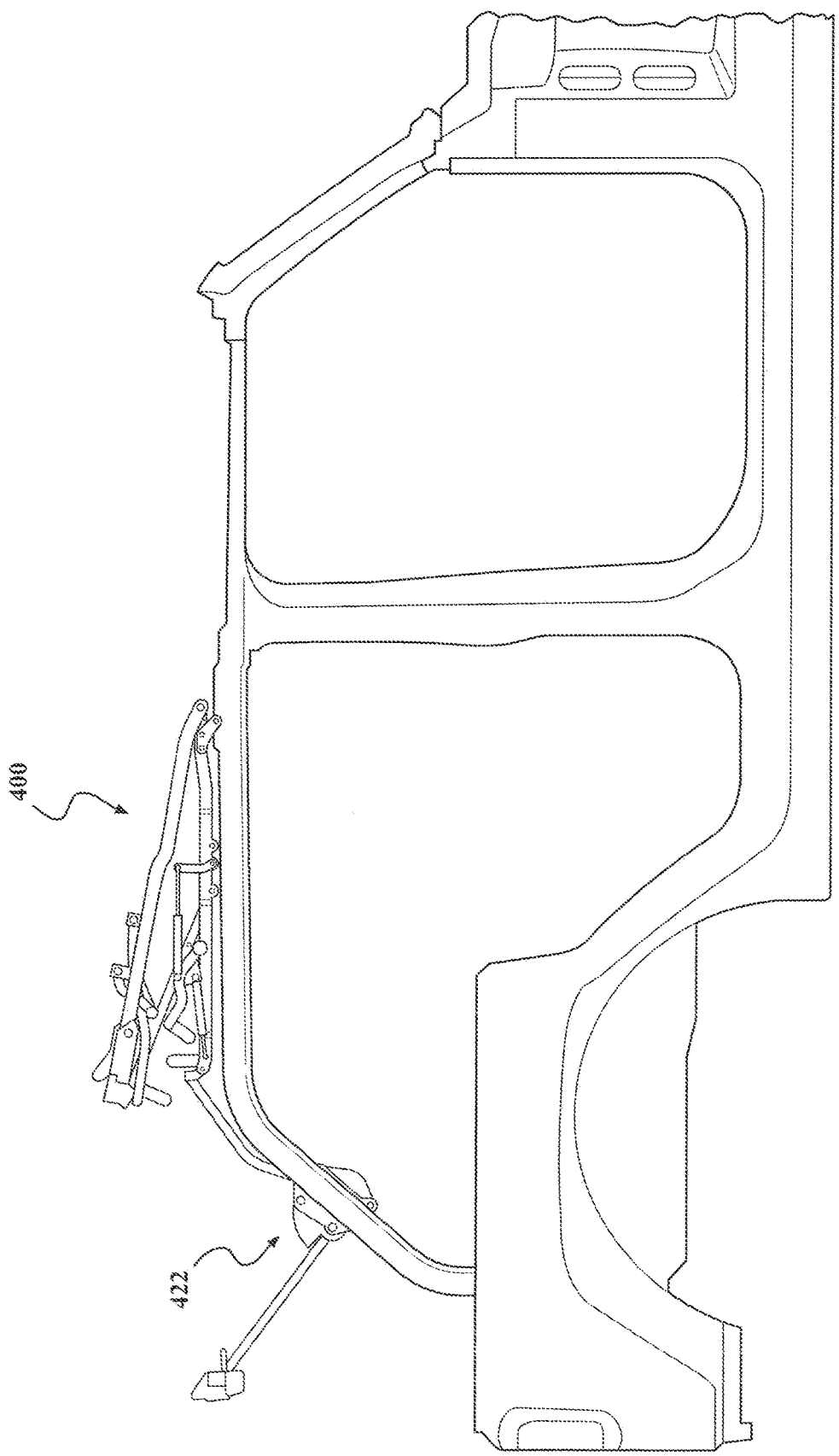
FIG. 21 is a side elevation view of the soft top cover assembly of FIGS. 19-20 in an open sunroof position.

FIG. 21 is a side elevation view of the soft top cover assembly 400 of FIG. 20 in an open sunroof position, according to the present invention.

Figure 22:
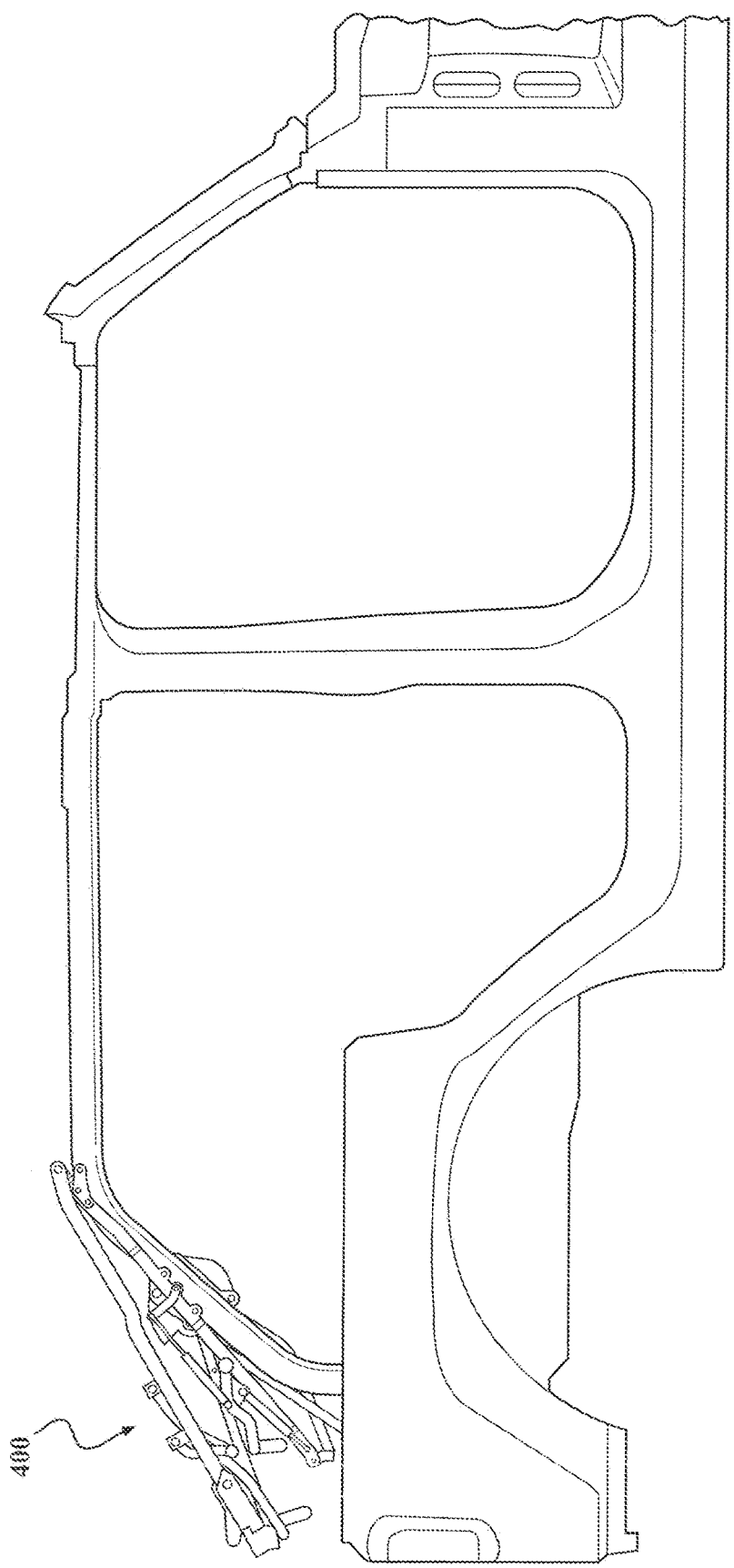
FIG. 22 is a side elevation view of the soft top cover assembly of FIGS. 19-21 in an open/down position; and, FIG. 23 is a side elevation view of a soft top cover assembly with a rear bow attached, shown in a closed position connected to a 4-door vehicle, according to another embodiment of the present invention.
Figure 23:
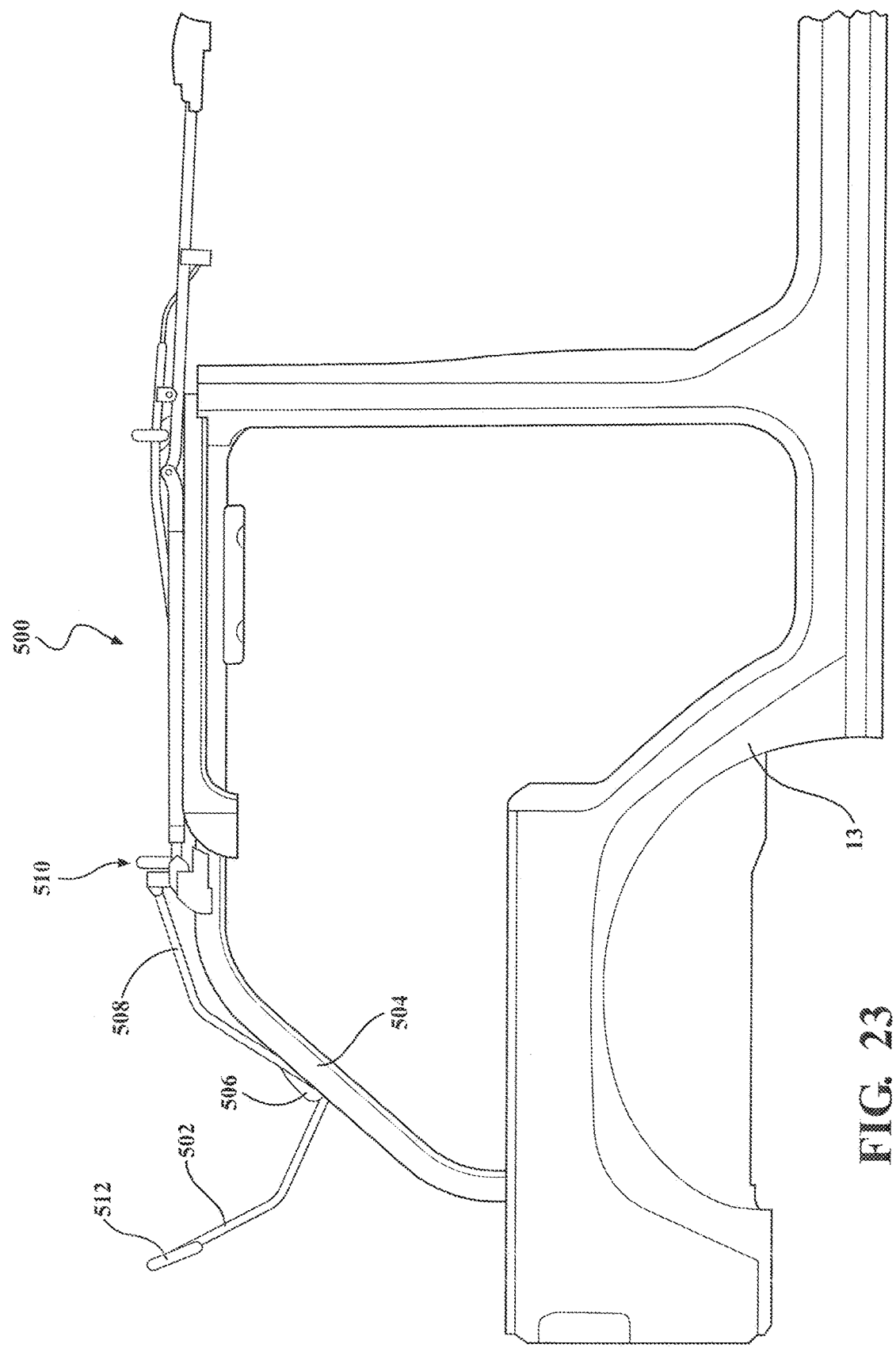

FIG. 22 is a side elevation view of the soft top cover assembly of FIGS. 20-21 in an open/down position, according to the present invention;

FIG. 23 is a side elevation view of a soft top cover assembly shown generally at 500 in a closed position connected to a 4-door vehicle 12 (with portions removed for clarity), according to another embodiment of the present invention. In one embodiment, a rear bow link 502 is rotatably connected to the rear sport bars 504 by a bracket 506. A 5-bow upright 508 is connected to a 4-bow shown generally at 510. This embodiment is similar to FIG. 1, however, there is a rear bow 512 and rear bow link 502 added.

In another embodiment the soft top is removable from the vehicle when in the open/down position.

Figure 9:
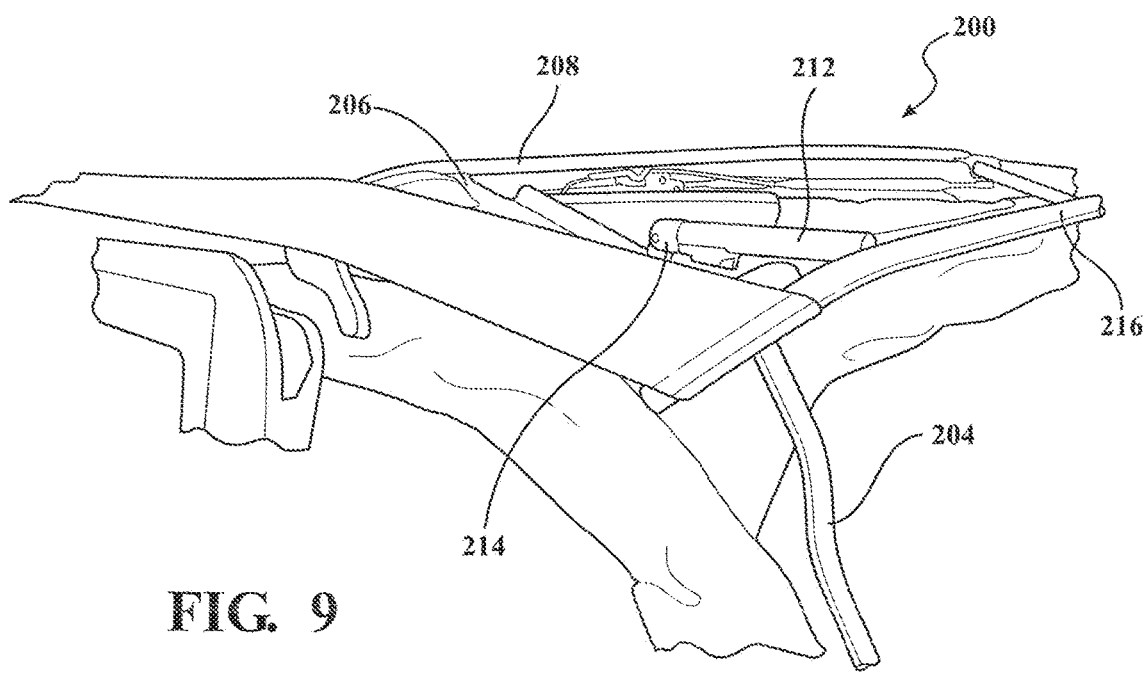
FIG. 9 is an enlarged perspective view including a rear transition area of the soft top cover assembly taken from FIG. 8.
Figure 11:
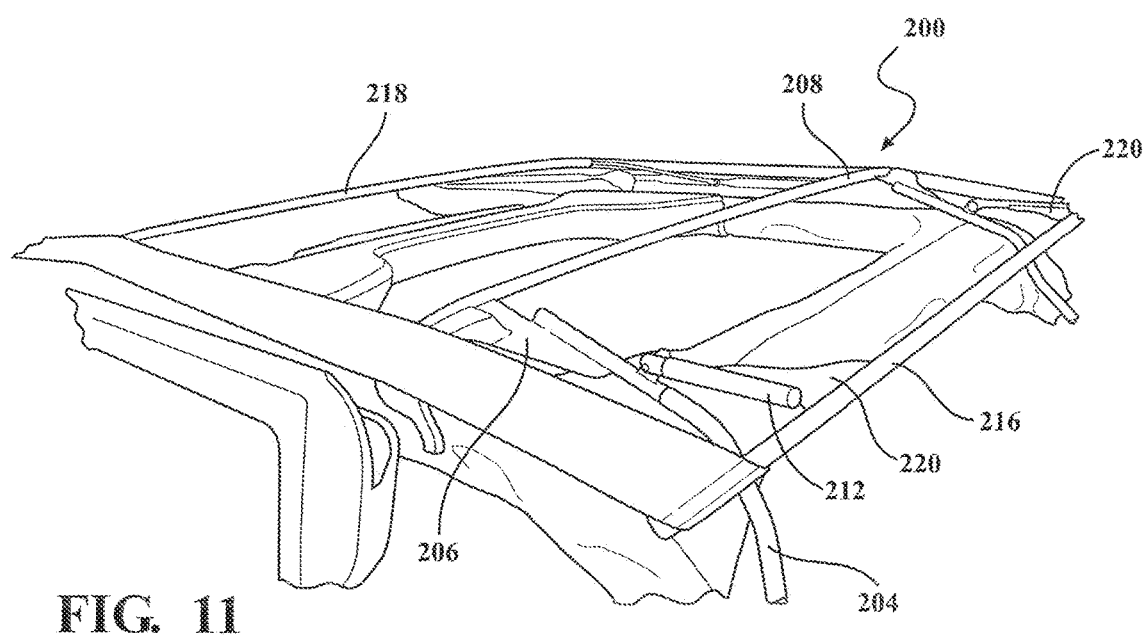
FIG. 11 is an enlarged perspective taken from FIG. 8.
Figure 12:
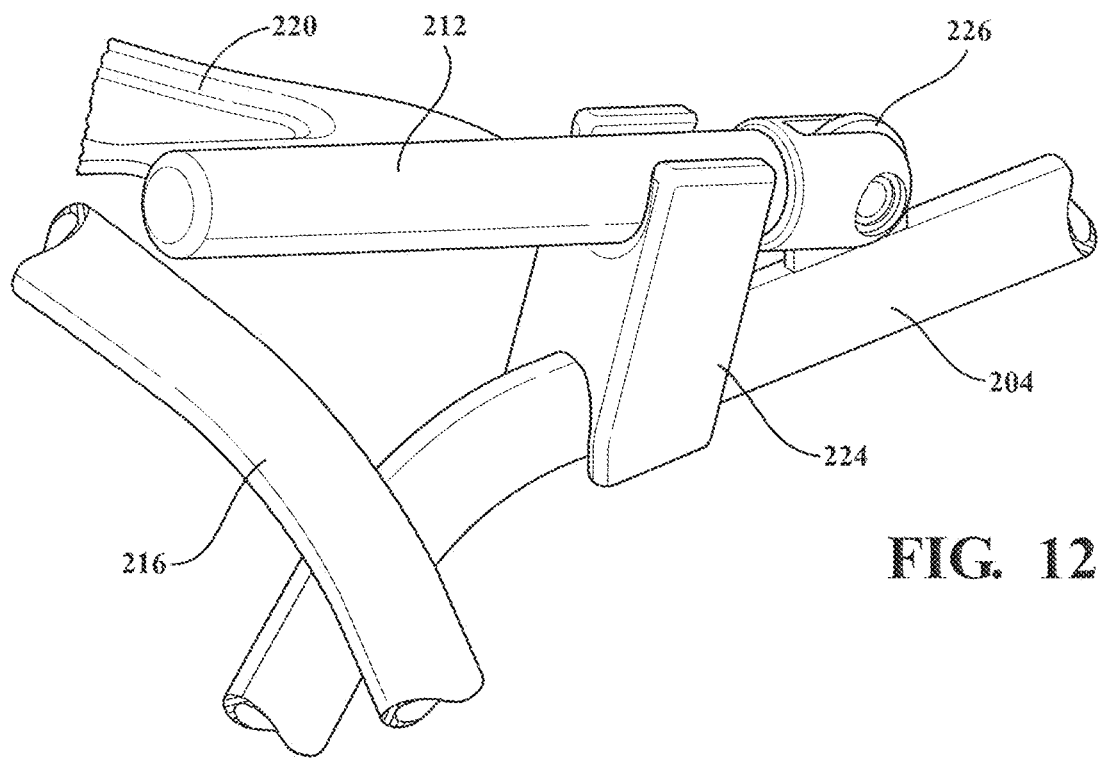
FIG. 12 is a right side rear perspective view including lockdown arrangement features of the soft top cover assembly of FIG. 8, in accordance with an embodiment of the present invention.
Figure 13:
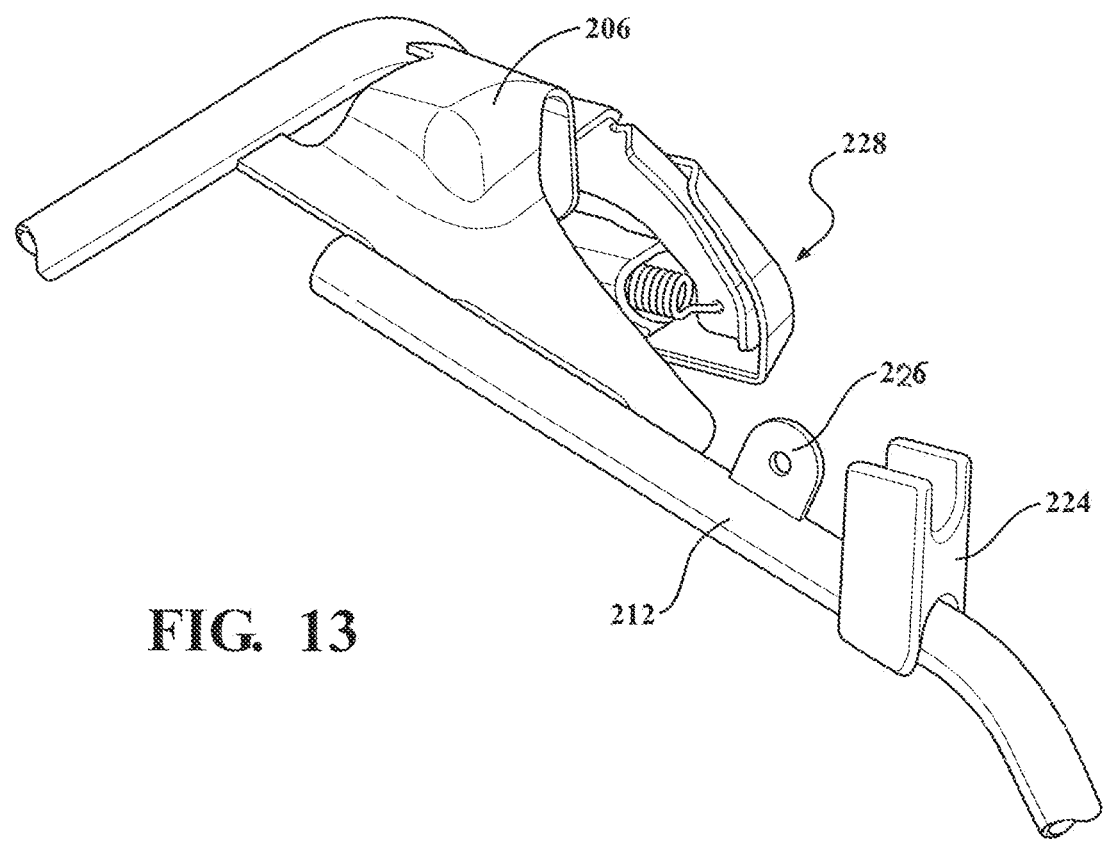
FIG. 13 is a left side rear perspective view including a rear assembly arrangement of the soft top cover assembly of FIG. 12.
Figure 14:
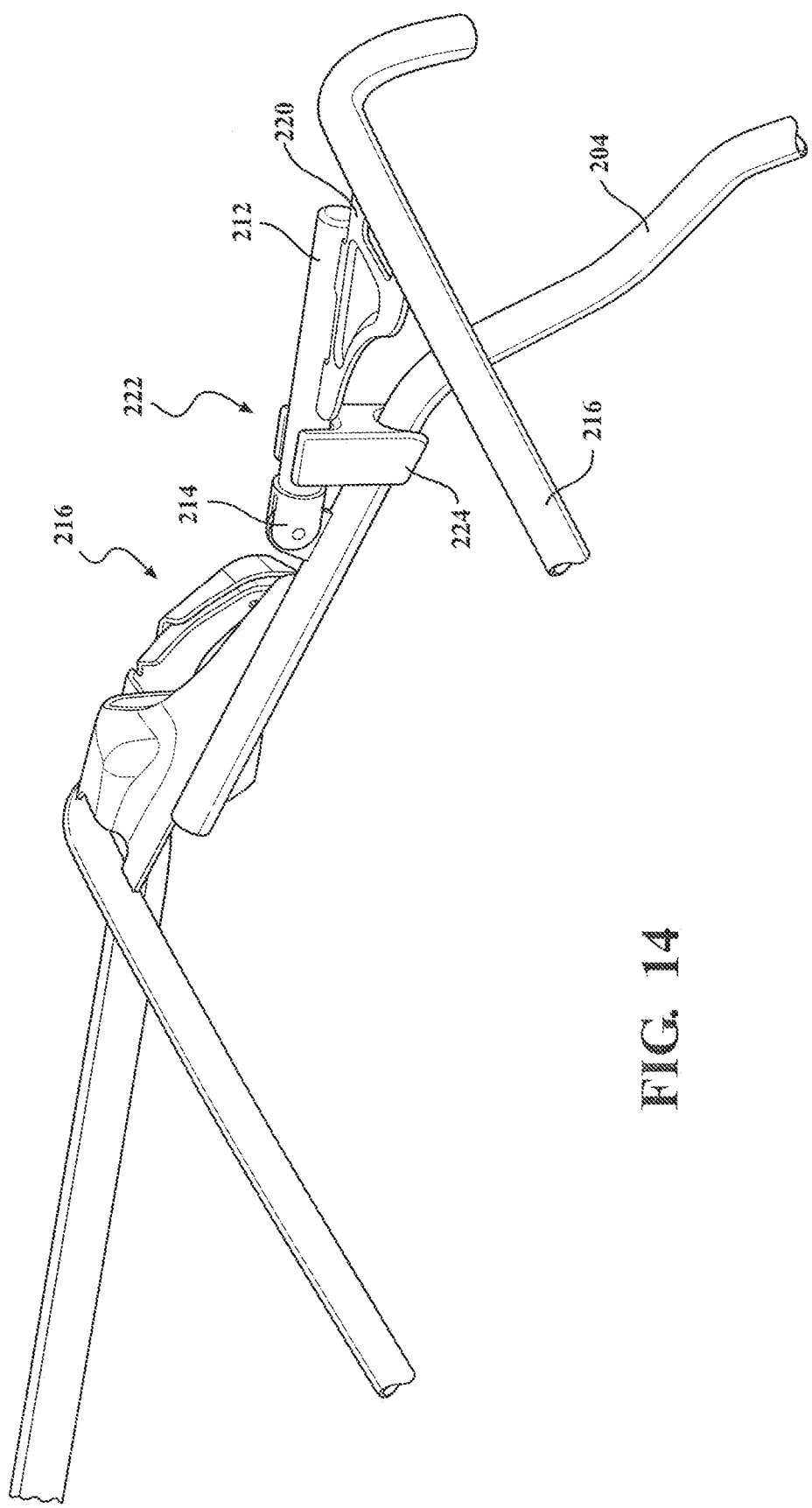
FIG. 14 is an enlarged rear perspective view including the lockdown arrangement of FIG. 12.

The soft top assembly according to any embodiment of the present invention is also preferably secured to front door surrounds, and additionally rear door surrounds for 4-door vehicles (such as FIGS. 9 and 11 rear door surround).

Providing at least one seal, e.g., rubber, foam, etc, to prevent water from entering the vehicle is contemplated without departing from the scope of the present invention. Preferably, rubber to prevent water permeation. According to one embodiment, the seal, e.g., bulb seal, is located on a door rail and seals off with the underside of the header.

Providing a unique header to door rail interface is contemplated without departing from the scope of the present invention. Adding at least one seal in this region is contemplated without departing from the scope of the present invention.

Providing at least one hole in a trough/lip area of a door rail, e.g., between door edge and door weather-strip, for assisting with water drainage is contemplated without departing from the scope of the present invention.

Providing at least one stop to set the predetermined height of the assembly in the open sunroof position is contemplated without departing from the scope of the present invention.

Providing a header that is steel, cast aluminum, molded plastic, or any other material to meet predetermined requirements is contemplated without departing from the scope of the present invention, preferably, the header is cast aluminum.

The cover is operably coupled to the header. Visual attachment of fasteners for access is contemplated without departing from the scope of the present invention.

Preferably, the soft top assembly is secured to a windshield frame with quick release latches. Locating features on each latch and a corresponding saddle on the windshield frame are contemplated without departing from the scope of the present invention.

At least one locking mechanism, e.g., rear location to lock down position of top in down position, and/or at least one trigger release arrangement is provided according to an embodiment of the present invention.

Incorporating removable soft upper half door(s), soft full door(s) and/or soft quarter panels with any of the above soft top cover assemblies is contemplated without departing from the scope of the present invention.

The 2-door and 4-door descriptions described herein are not limiting. It is understood that any embodiment, and combinations thereof, described herein can be modified and is/are utilizable on any convertible, 2-door or 4-door vehicle.

It is understood that the left side of the assemblies are substantially a mirror-image of the right side of the assemblies.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A folding/retractable soft top assembly for a sport utility vehicle, comprising:
    a cover;
    a rear window panel coupled adjacent to a tailgate of the vehicle;
    an articulating folding frame coupled to the cover and selectively rotatable between a closed position and an open sunroof position, said articulating folding frame further moveable rearward to at least one further open position when desired;
    a rear support structure coupled to the vehicle and setting the height of a cover transition to the rear window panel, said rear support structure causing the rear window panel to be slanted at a predetermined angle from vertical when the cover is in the closed or open sunroof positions.

2. The folding/retractable soft top assembly of claim 1, wherein the predetermined angle is at least about 15 degrees from vertical.

3. The folding/retractable soft top assembly of claim 1, wherein the predetermined angle is at least about 25 degrees from vertical.

4. The folding/retractable soft top assembly of claim 1, wherein the predetermined angle is at least 35 degrees from vertical.

5. The folding/retractable soft top assembly of claim 1, wherein the rear support structure is mounted to rear sport bars of the vehicle.

6. The folding/retractable soft top assembly of claim 1, wherein the rear window panel is removable from the cover.

7. The folding/retractable soft top assembly of claim 1, further comprising at least one track connected to the vehicle, said articulating folding frame coupled to the track to move said articulating folding frame to the rearward open position.

8. The folding/retractable soft top assembly of claim 1, wherein the rear support structure includes a pair of upright bows rotatably mounted to the vehicle and connected to a bow that is a cross vehicle bow to set the height of the cover transition to the rear window panel.

9. The folding/retractable soft top assembly of claim 8, wherein the pair of upright bows are rotatably mounted to a bracket that is connected to rear sport bars of the vehicle.

10. The folding/retractable soft top assembly of claim 1, wherein the rear support structure includes a bow fixedly connected to a pair of upright bows that are rotatably mounted to the vehicle, wherein the bow is a cross vehicle bow to set the height of the cover transition to the rear window panel.

11. The folding/retractable soft top assembly of claim 1, wherein the rear support structure further comprises:
    a pair of upright bows rotatably mounted to the vehicle;
    a pair of bows rotatably connected to the pair of upright bows, respectively;
    a bow connected to the pair of bows, wherein the bow is a cross vehicle bow to set the height of the cover transition to the rear window panel.

12. The folding/retractable soft top assembly of claim 11, wherein the pair of upright bows are additionally fixedly connected to a top deck bow that is a cross vehicle bow.

13. The folding/retractable soft top assembly of claim 11, wherein the rear support structure further includes a lockdown assembly to prevent the articulating folding frame from moving rearward to the rearward open position until desired.

14. The folding/retractable soft top assembly of claim 13, wherein the lockdown assembly includes a pair of braces to capture the pair of bows, respectively, to lock the pair of bows in place when the cover is closed or in the open sunroof position.

15. The folding/retractable soft top assembly of claim 1, wherein the rear support structure includes a bow connected to a pair of vertical bows, when in an up/closed position, that are rotatably mounted to the vehicle, wherein the bow is a cross vehicle bow to set the height of the cover transition to the rear window panel.

16. The folding/retractable soft top assembly of claim 1, wherein the rear support structure is coupled to a lockable lift assist.

17. The folding/retractable soft top assembly of claim 1, wherein the articulating folding frame includes at least one articulating linkage assembly with at least one fabric management bow.

18. The folding/retractable soft top assembly of claim 1, wherein the articulating folding frame includes at least one articulating linkage assembly with a plurality of fabric management bows.

19. A retractable soft top assembly for a sport utility vehicle having a slant back window profile, comprising:
    an articulating folding frame coupled to the vehicle sport bars and including a rotatable portion selectively rotatable between a closed position and an open sunroof position, said articulating folding frame operably slidable rearward from the open sunroof position to at least an open/down position when desired;
    a cover listed to the articulating folding frame;
    a rear window panel that is selectively removable from the cover;
    a rear support structure coupled to the vehicle and setting the height of a cover transition to the rear window panel, said rear support structure causing the connected rear window panel to be slanted at a predetermined angle from vertical when the cover is in the closed or open sunroof positions.

20. A folding/retractable soft top assembly for a sport utility vehicle, comprising:

an articulating folding frame including a rotatable portion selectively rotatable between a closed position and an open sunroof position, said articulating folding frame further movable rearward from the open sunroof position to at least an open/down position when desired;
a cover coupled to the articulating folding frame;
a rear window panel coupled at the rear of the vehicle;
a rear support structure coupled to the vehicle and setting the height of a cover transition to the rear window panel, said rear support structure causing the rear window panel and surround to be slanted at a predetermined angle from vertical when the cover is in the closed or open sunroof positions, wherein the predetermined angle is at least 25 degrees from vertical.

* * * * *